United States Patent
Zhang et al.

(10) Patent No.: US 10,275,046 B2
(45) Date of Patent: Apr. 30, 2019

(54) ACCESSING AND INTERACTING WITH INFORMATION

(75) Inventors: Chunhui Zhang, Beijing (CN); Min Wang, Beijing (CN); Richard Harper, Cambridge (GB); Tong Yuan, Beijing (CN); Chunshui Zhao, Beijing (CN); Xiangwei Zhu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 400 days.

(21) Appl. No.: 12/965,652

(22) Filed: Dec. 10, 2010

(65) Prior Publication Data
US 2012/0151339 A1   Jun. 14, 2012

(51) Int. Cl.
  *G06F 3/033*   (2013.01)
  *G06F 3/0346*  (2013.01)
  (Continued)

(52) U.S. Cl.
  CPC ........... *G06F 3/0346* (2013.01); *G06F 3/016* (2013.01); *G06F 3/0338* (2013.01); *G06F 3/04815* (2013.01); *G06F 21/34* (2013.01)

(58) Field of Classification Search
  CPC ...... G06F 3/00; G06F 19/345; G06F 19/3481; G06F 19/327; G06F 19/328; G06F 19/3418; G06F 19/3443; G06F 19/3456; G06F 19/322; G06F 19/3425; G06F 19/3475; G06F 17/28; G06F 19/324; G06F 19/3412; G06F 19/3468; G06F 8/60; G06F 8/65; G06F 15/16; G06F 17/289; G06F 19/12; G06F 3/048; G06F 7/023; G06F 8/51; G06F 9/4433; G06F 9/4436; G06F 9/542;
  (Continued)

(56) References Cited

U.S. PATENT DOCUMENTS 5,757,360 A * 5/1998 Nitta ............... G06F 3/0346
                                                            345/156
5,973,670 A * 10/1999 Barber et al. .......... 345/157
(Continued)

FOREIGN PATENT DOCUMENTS

| CN | 1732429 | 2/2006 |
|---|---|---|
| CN | 201233581 | 5/2009 |
| WO | 2004059572 A2 | 7/2004 |

OTHER PUBLICATIONS

Remotely Hosted Services and "Cloud Computing" www.cs.bris.ac.uk/home/dc/cliff_becta_clouds.pdfYou +1'd this publicly. Undo File Format: PDF/Adobe Acrobat—Quick View by D Cliff—2010, Dave Cliff.*

(Continued)

*Primary Examiner* — Di Xiao
(74) *Attorney, Agent, or Firm* — Schwegman Lundberg & Woessner, P.A.

(57) ABSTRACT

In some implementations, an access device may sense movement in six degrees of freedom for interacting with information in a user interface. In some implementations, a security feature may be included for verifying an authorization of a user to use the access device. Additionally, in some implementations, the access device may establish communication with an available computing device for accessing and interacting with information that may include remotely stored information, cloud data, cloud services, and the like.

19 Claims, 15 Drawing Sheets

(51) Int. Cl.
*G06F 3/01* (2006.01)
*G06F 3/0338* (2013.01)
*G06F 3/0481* (2013.01)
*G06F 21/34* (2013.01)

(58) Field of Classification Search
CPC .......... G06F 17/3061; G06F 17/30976; G06F 17/5022; G06F 17/5036; G06F 17/5077; G06F 19/30; G06F 19/323; G06F 19/325; G06F 19/3406; G06F 19/3437; G06F 19/363; G06F 2217/04; G06F 2217/12; G06F 3/01; G06F 3/041; G06F 3/0481; G06F 3/0482; G06F 3/167; G06F 8/10; G06F 8/34; G06F 9/30029; G06F 9/4425; G06F 9/4446; G06F 9/46; G06F 9/5044
USPC ........................................ 715/835, 838, 702
See application file for complete search history.

(56) References Cited

U.S. PATENT DOCUMENTS

| | | | |
|---|---|---|---|
| 6,297,838 B1* | 10/2001 | Chang | G06F 1/16 345/156 |
| 6,545,663 B1* | 4/2003 | Arbter | G06F 3/0425 345/156 |
| 6,597,347 B1* | 7/2003 | Yasutake | G06F 3/0338 178/18.01 |
| 7,337,400 B1* | 2/2008 | Elbing et al. | 715/702 |
| 7,596,620 B1* | 9/2009 | Colton et al. | 709/226 |
| 8,271,653 B2* | 9/2012 | DeHaan | 709/226 |
| 8,301,764 B2* | 10/2012 | Konig et al. | 709/224 |
| 8,384,665 B1* | 2/2013 | Powers, III | A63F 13/06 345/156 |
| 2001/0038376 A1* | 11/2001 | Sato | 345/156 |
| 2007/0214886 A1* | 9/2007 | Sheynblat | G01P 15/18 73/509 |
| 2009/0289110 A1 | 11/2009 | Regen et al. | |
| 2009/0319688 A1 | 12/2009 | Mason et al. | |
| 2010/0061250 A1 | 3/2010 | Nugent | |
| 2010/0153313 A1* | 6/2010 | Baldwin et al. | 706/11 |
| 2012/0016778 A1* | 1/2012 | Salle et al. | 705/27.1 |
| 2012/0069131 A1* | 3/2012 | Abelow | G06Q 10/067 348/14.01 |
| 2012/0151339 A1* | 6/2012 | Zhang et al. | 715/702 |

OTHER PUBLICATIONS

AboveTopSecret.com, "Sixth Sense Technology—Projection Interface Device—Must See!!", retrived from <<http://www.abovetopsecret.com/forum/thread587768/pg1>> on Aug. 6, 2010, pp. 1-pp. 18.

Becta Emerging Technologies, "Cloud Mouse to enable 3D interaction with data (Mar. 2010)", retrieved at <<http://emergingtechnologies.becta.org.uk/index.php?section=etn&rid=15254>> on Aug. 4, 2010, pp. 1-pp. 3.

Microsoft Research, "A New Way to Interact with the Cloud", retrieved at <<http://research.microsoft.com/en-us/news/features/030419-clientcloud.aspx>> on Aug. 4, 2010, pp. 1-pp. 2.

Microsoft Research, "Inside the Cloud", 2010, retrieved at <<http://research.microsoft.com/en-us/projects/cloudmouse/>> on Aug. 4, 2010.

Translated the Chinese Office Action dated Feb. 8, 2014 for Chinese patent application No. 201110462793.5, a counterpart foreign application of U.S. Appl. No. 12/965,652, 14 pages.

Translated the Chinese Office Action dated Apr. 17, 2015 for Chinese patent application No. 201110462793.5, a counterpart foreign application of U.S. Appl. No. 12/965,652, 15 pages.

Translated the Chinese Office Action dated Nov. 9, 2015 for Chinese patent application No. 201110462793.5, a counterpart foreign application of U.S. Appl. No. 12/965,652, 10 pages.

Translated Chinese Office Action dated Oct. 8, 2014 for Chinese patent application No. 201110462793.5, a counterpart foreign application of U.S. Appl. No. 12/965,652, 10 pages.

* cited by examiner

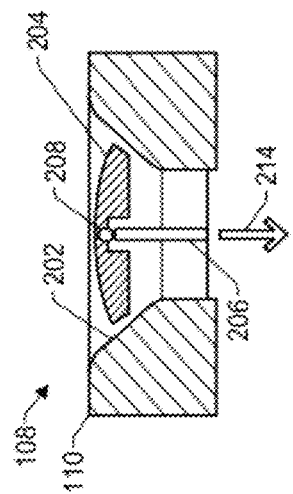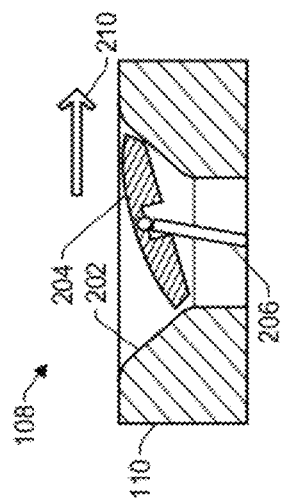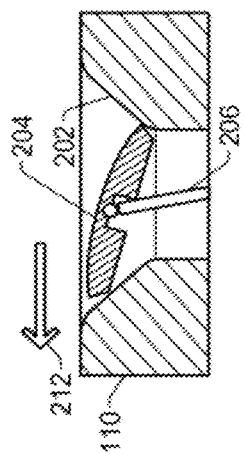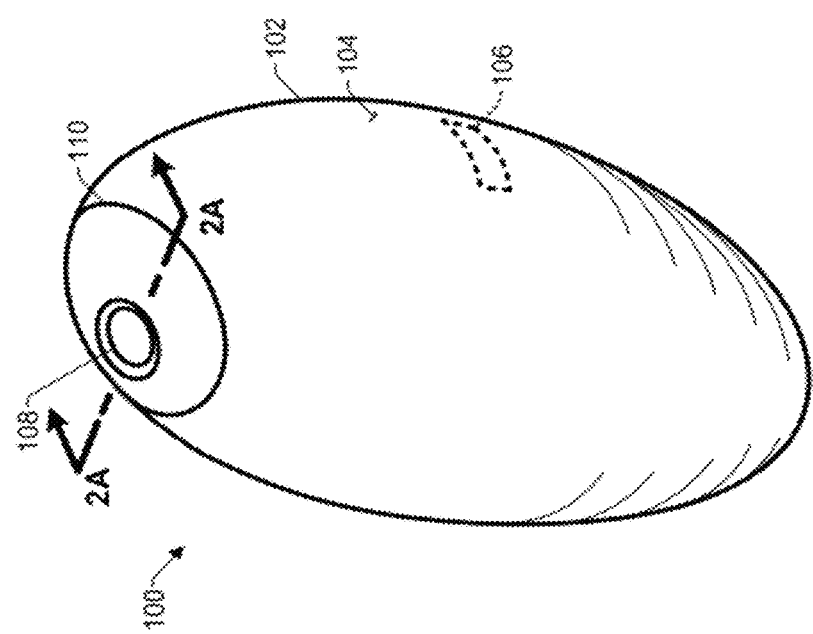

ACCESSING AND INTERACTING WITH INFORMATION

BACKGROUND

Many conventional computer desktop interfaces present information to a user in a generally two-dimensional format intended to resemble a physical desktop. In these interfaces, the information itself often emulates paper-based formats, such as documents and reports. These two-dimensional types of interface layouts serve satisfactorily for interacting with these information formats. However, for other forms of information, such as for capturing and visualizing relationships between information, people, etc., a two-dimensional layout may not provide an optimal interface. For example, data mining of information from a multitude of sources, such as are available on the World Wide Web, can result in complex three-dimensional relationships between sources and targets of information. As another example, social networks are used as more than simply messaging systems, and may represent geographic arrays of things to do, people to meet, and so forth. Further, the emergence of cloud computing as an infrastructure provides both a pretext, and resources, for new types of information storage and interaction. For instance, the cloud computing paradigm makes new data mining techniques possible, and the cloud can also bring together real-time data about friends and family in a manner that was not previously possible. Additionally, by having their data stored in the cloud, users are no longer limited to accessing their information on or through a single computer. Thus, human-computer interaction is moving beyond conventional desktop-style interfaces.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide for three-dimensional interaction with information and interfaces. In some implementations, an access device may be used to access and interact with information through various computing devices, such as for accessing a user's information maintained in a cloud computing environment, remote location, or the like. For example, the access device may act as a key with integrated security for accessing and interacting with a user's information through an available computing device.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 1 is perspective view of an example of an access device according to some implementations.

FIGS. 2A-2C are cross-sectional views taken along line 2A-2A of FIG. 1 according to some implementations.

DETAILED DESCRIPTION

Accessing and Interacting with Information

Figure 3:
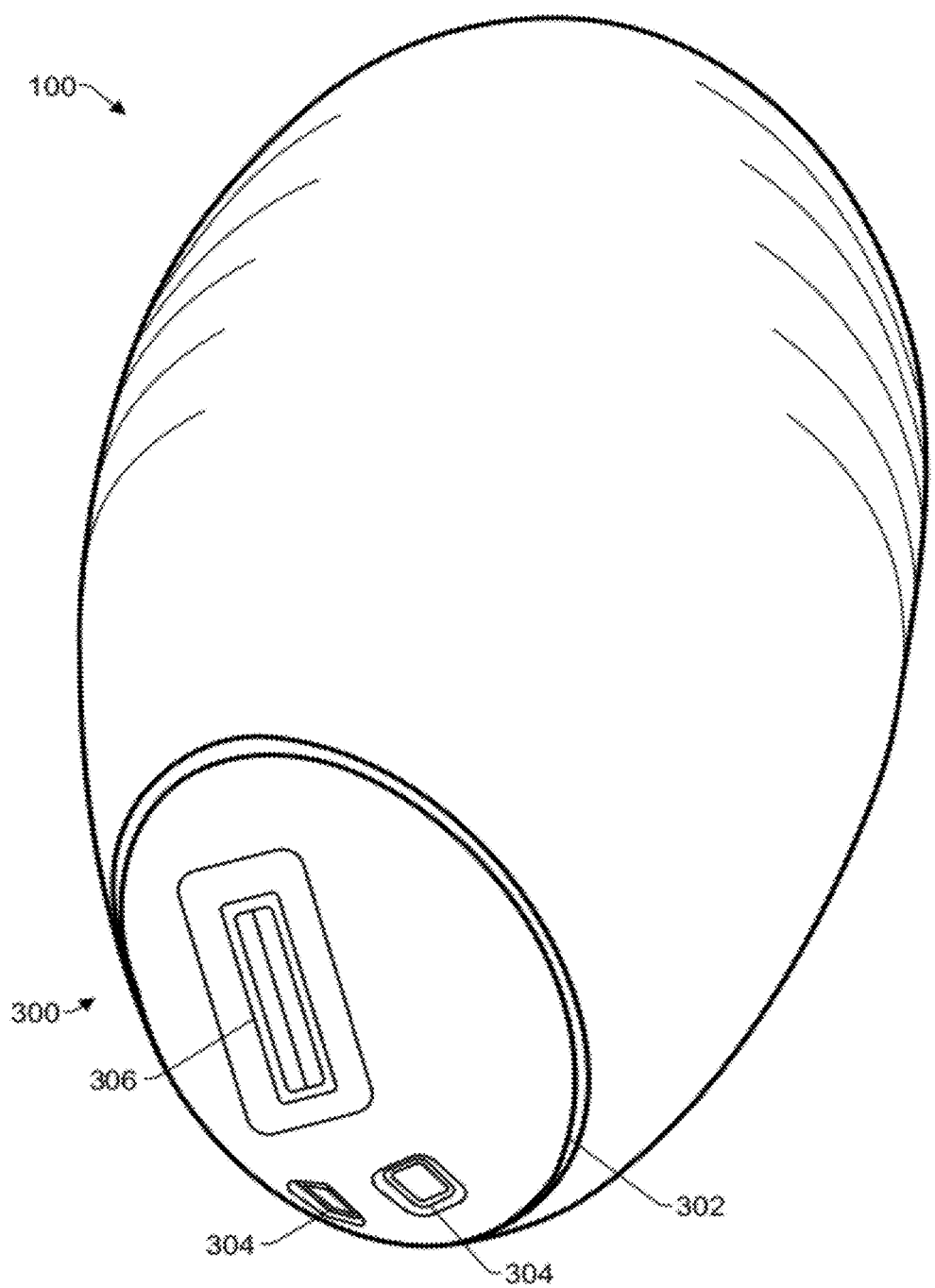
FIG. 3 is a perspective view illustrating a bottom portion of the access device according to some implementations.

The technologies described herein are generally directed toward accessing and interacting with information. According to some implementations, an access device may act as a secure key for enabling users to access their data, such as in a cloud-computing environment, in a remote storage location, or the like. For example, in a cloud-type computing environment or a remote storage environment, users may not be limited to accessing their personal data from a particular computing device. Consequently, some implementations provide an access device useful for cloud computing that may be able to employ any nearby computing device for accessing and interacting with the user's information. Further, some implementations of the access device may include six degree-of-freedom (DOF) control, integrated security features and feedback mechanisms. The access device may allow users to access and interact with their data in a three-dimensional (3D) manner, such as for providing an "inside the cloud" effect in which users can intuitively view and manipulate data items or objects in a virtual 3D space. Further, the access device herein may enable innovative forms of data and interfaces to be provided to users, such as in applications ranging from web data mining to social networks.

In some implementations, the access device herein may provide direct pointing operations, grasp-hold-release user interaction with virtual objects, and tangible feedback to a user. By detecting up to six DOF, the access device can enable the user to navigate within, across, and around diverse sets of information resources, such as those available in a cloud-computing environment. As remotely stored information and cloud computing services are not limited to being accessed from a particular location or computing device, the access device may be used to access a user's information or services from any display or computing device with access to the cloud (e.g., the Internet). Accordingly, in some implementations, the access device may act as a user's physical key to the user's data and services, and may include information and security features for securely accessing and guarding the user's personal data and services. For example, in some implementations, the access device may incorporate biometric or physiological identification recognition technology, such as a fingerprint reader, an iris scanner, a DNA detector, or the like, to ensure that only an authorized user can utilize the access device.

Some implementations herein provide an access device that also serves as an input/output (I/O) device for interacting with various types of user interface paradigms. For example, the access device may be a personal access and control device for interfacing and interacting with a cloud-computing environment. The access device can be configured to securely access remote information in the cloud environment on one or more available computing devices, and may interact with multiple computing devices contemporaneously. In some implementations, a cloud-computing environment may include stores of information about computer-mediated user behaviors. This information can be mined and used to produce aggregations of data generated by a huge number of users, which in turn may lead to new insights and service opportunities.

According to some implementations herein, the access device may be a 3D mid-air pointing and interaction device including an inertial sensor and other sensor for sensing movement in six DOF. In some implementations, the access device enables users to interact with their information using intuitive motions and gestures. For example, using the access device, a user may select a virtual item or object displayed in a user interface by positioning a cursor or pointer over or in contact with the object. Feedback may be provided to the user when the pointer contacts the object, such as by providing a vibration or other tactile feedback to the access device. Additional or alternative feedback may include a sound produced by the access device and/or a change in a color of lighting emitted by the access device. Similarly, if the pointer encounters a virtual barrier in an interface such as an edge of a screen, or the like, additional feedback may be provided by the access device to indicate a collision.

The user may grab and hold a virtual object displayed in the user interface by squeezing and holding the access device. When the user successfully grabs and holds an object, the access device may provide additional feedback such as vibration, sound, change in lighting, or the like, to confirm that the object has been grabbed. The user may continue to hold the object and drag the object to a desired location in the user interface by moving the access device. When the object is in the desired location, the user may release the object by gripping the access device less tightly. Thus, in some implementations, the access device detects a level of grip exerted by a user for determining user intentions, such as whether the user desires to grab an object. Accordingly, implementations herein enable a natural and efficient grasping interaction mechanism.

Example Access Device

FIG. 1 illustrates an example of an access device 100 according to some implementations herein. In the illustrated example, access device 100 includes a generally egg-shaped housing 102, which may be constructed from plastic, metal, or other suitable material, and which may include a non-slip exterior coating 104. At least one strain sensor 106 may be attached to, mounted on, embedded in, or otherwise conjoined to the housing 102. For example, when a user desires to grasp or grab a virtual item or object displayed in a user interface, the user may squeeze the access device 100 more firmly. When the strain sensor 106 detects that the access device 100 has been squeezed sufficiently to exceed a predetermined strain threshold, a grab action may be registered by the access device 100. Continuing to squeeze the access device 100 above the predetermined strain threshold may be registered as a holding action. When the user loosens his or her grip below the predetermined strain threshold, the object is released. As mentioned above, feedback, such as vibration, a sound or other feedback may be provided to the user so that the user knows when an item has been grabbed, held or released.

Additionally, the access device may include a pointing stick, trackball, or other type of joystick mechanism 108 as part of an upper portion 110 of the access device 100, positioned so as to be easily manipulated by a user's thumb. The joystick mechanism 108 may be used for precision or fine-grained interaction with virtual objects in a user interface, such as in situations in which hand or arm gestures are too gross.

FIGS. 2A-2C illustrate a cross-sectional view of the joystick mechanism 108 according to some implementations, as taken along line 2A-2A of FIG. 1. The joystick mechanism 108 may be recessed in an opening 202. Opening 202 may be generally in the shape of an inverted truncated cone. Having the joystick mechanism 108 recessed in the opening 202 helps prevent accidental operation of the joystick mechanism 108. The joystick mechanism 108 may include a circular button 204 connected to a control shaft 206 by a pivotable joint 208, such as a ball-and-socket joint, or the like. As illustrated in FIGS. 2B and 2C, a user may move the button 204, left, right, forward, backward, or various angles in between, which moves or bends a control shaft 206. The movement or bending of control shaft 206 thereby controls motion of a cursor or pointer displayed in a user interface, as described additionally below. For example, as illustrated in FIG. 2B, when the button 204 is moved in the direction of arrow 210, the upper part of shaft 206 also moves in the direction of arrow 210, while the button 204 tends to pivot about joint 208 and ride up the conical opening 202. Similarly, as illustrated in FIG. 2C, when the button is moved in an opposite direction indicated by arrow 212, the upper part of shaft 206 also moves in the direction of arrow 212, and the button 204 pivots and rides up the other side of conical opening 202. In addition, as illustrated in FIG. 2A, the button 204 may be mounted a slight distance away from direct contact with the conical opening 202 so that the button 204 may be pressed down in the direction of arrow 214, such as for performing a click or selection action. Consequently, the joystick mechanism 108 may also be used as a selection instrument by pressing downward on joystick mechanism 108. For example, pressing the button 204 in the downward direction may result in the equivalent of a "left-click" or "right-click" type of action being registered, or other desired action.

FIG. 3 illustrates a perspective view of the bottom 300 of the access device 100 including a bottom portion 302. Bottom portion 302 may include charging pads 304 for recharging a power supply of the access device 100. For example, when not in use, access device may be placed in a stand (not shown) for charging the access device 100. Additionally, bottom portion 302 may include an access control component 306 for enabling a user to provide authentication to the access device 100. In some implementations, access control component 306 may be a biometric access control component, such as a finger print reader, an iris or retina scanner, a blood vessel pattern scanner, a DNA detector, or the like. For example, users may identify themselves to the access device 100 each time they use the access device. Further, when the access device 100 detects that it has been put down, or if the access device 100 detects no movement or motion over a specified period of time, the next time the access device 100 is picked up or moved, the access device 100 may request that the user provide authentication, such as biometric verification through the biometric access control component. Additionally, in some implementations, rather than being a biometric access component, access control component 306 may be a keypad or the like that enables a user to enter a password or passcode.

Figure 4:
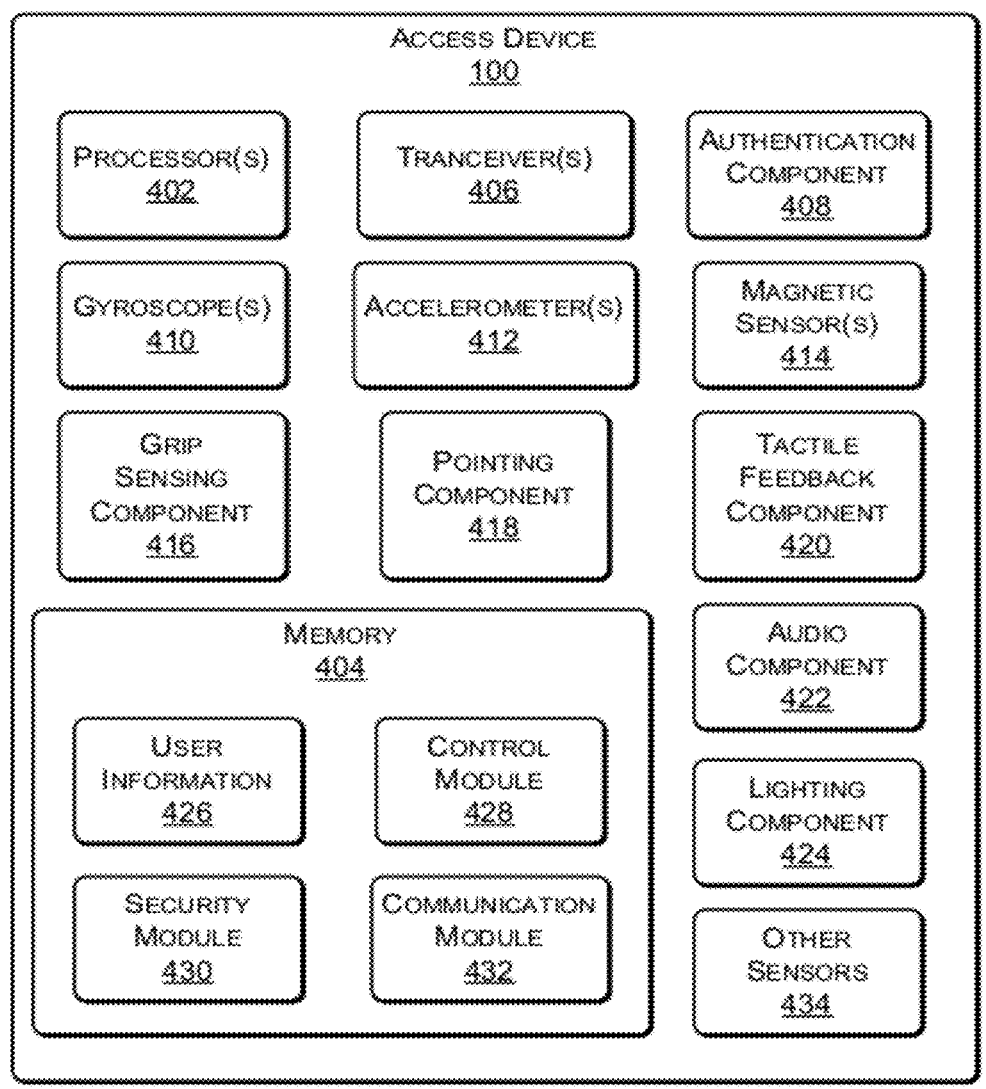
FIG. 4 is a block diagram illustrating selected elements of an example access device according to some implementations.

FIG. 4 is a block diagram illustrating selected elements of an example access device 100 according to some implementations. In the illustrated example, the access device 100 includes one or more processors 402, a memory 404, and one or more transceivers 406. In some implementations, the processor 402 is a microprocessing unit (MPU), a central processing unit (CPU), or other processing unit or component known in the art. Among other capabilities, the processor 402 can be configured to fetch and execute computer-readable processor-accessible instructions stored in the memory 404 or other computer-readable storage media. In various implementations, memory 404 is an example of storage media that may include both volatile memory and non-volatile memory (e.g., RAM, ROM, Flash Memory, miniature hard drive, memory card, or the like). Additionally, in some implementations, memory 404 includes a removable memory card that may be inserted or removed by a user of the access device 100. For example, in the case of a commonly owned access device 100, each user may insert his or her memory card into the access device, provide authentication, and then begin use of the access device 100.

Transceiver 406 may include any devices for receiving and/or transmitting information known in the art. For example, transceiver 406 may include a radio transceiver and interface that performs the function of transmitting and receiving radio frequency communications via an antenna (not shown). In some implementations, transceiver 406 may include a near-field transceiver that performs a function of transmitting and receiving near-field radio communications. For example, the near-field transceiver may be used for functions, such as communicating directly with nearby devices that are enabled for near-field communication, for instance, via Bluetooth® or other radio frequency protocol. Additionally, transceiver 406 may include a wireless LAN interface that performs the function of transmitting and receiving wireless communications using, for example, the IEEE 802.11, 802.16 and/or 802.20 standards. For example, the access device 100 can use a Wi-Fi interface to communicate with a nearby wireless access point, such as for accessing one or more nearby computing devices via a Wi-Fi connection.

Access device 100 also may include an authentication component 408, such as a biometric sensor for sensing a physical or physiological characteristic of a user for identifying the user as being authorized to operate the access device 100. As described above, the biometric sensor may be a fingerprint reader, and iris or retinal scanner, a blood vessel pattern reader, a DNA detector, a voice pattern detector, or other suitable biometric sensor. Alternatively, rather than a biometric sensor, authentication component 408 may include a keypad for entering a security code, password, or the like. Other security mechanisms are also contemplated within the scope of the disclosure herein.

Access device 100 may further include one or more gyroscopes 410, one or more accelerometers 412, and one or more magnetic sensors 414. As described additionally below with reference to FIG. 5, gyroscopes 410, accelerometers 412, and magnetic sensors 414 together provide inputs that enable the access device 100 to accurately track motions and gestures performed by a user holding the access device 100 in six DOF. An example of a suitable gyroscope 410 may be a three-axis MEMs (Micro Electro-Mechanical Systems) gyroscope such as is available from STMICROELECTRONICS of Geneva, Switzerland. An example of a suitable accelerometer may be a three-axis MEMs accelerometer, such as is available from FREESCALE SEMICONDUCTOR INC. of Austin, Tex. An example of a suitable magnetic sensor may be a three-axis geomagnetic sensor, such as is available from YAMAHA CORP. of Shizuoka, Japan.

The access device 100 may also include a grip sensing component 416 and a pointing component 418. As discussed above, the grip sensing component 416 may include one or more strain gauges for sensing a degree of grip exerted by a user. Further, the pointing component 418 may include the joystick mechanism 108 discussed above with reference to FIGS. 1 and 2A-2C for performing precision pointing functions.

The access device 100 may further include a tactile feedback component 420, an audio component 422, and a lighting component 424. For example, tactile feedback component 420 may include a vibration generation device, or the like, operable for providing haptic feedback to a user holding the access device 100. Furthermore, audio component 422 may also provide feedback to a user, and may include one or more speakers for generating audible feedback to a user. Additionally, audio component 422 may provide other functions, such as providing spoken instructions to a user. For example, when a user picks up the access device 100, the audio component 422 may instruct the user to provide a fingerprint scan or other authentication before being permitted to use the device.

Additionally, lighting component 424 may include one or more lights, such as for providing feedback or other indications to a user. For example, lighting component 424 may include one or more RGB LEDs (red-green-blue light-emitting diodes) for producing various colors of light to provide various different feedback indications or other state indications. For example, the housing 102 and coating 104 of the access device 100 may be translucent to enable the light produced by the lighting component 424 to be visible through the housing 102. This provides the access device with a glowing type effect that can provide a color-based indication to the user of the various states of the access device 100.

Memory 404 may include various modules and user information for enabling the access device 100 to perform the functions described herein. In some implementations, memory 404 may include user information 426, a control module 428, a security module 430, and a communication module 432. For example, user information 426 may include a variety of information for the user, including access information to be provided to a nearby computing device, such as locations of the user's data in the cloud or remote storage locations, favorite websites, social network sites, or the like. Additionally, user information 426 may include user interface settings and preferences to be applied by the computing device when presenting the user's remote data and services to the user on a display, as described additionally below. For example, the user information may specify that the computing device present the user's remote data to the user in a particular interface type from among multiple possible interfaces, may specify use of particular colors or backgrounds, and the like. This user information may be transmitted wirelessly to the computing device when the access device establishes communication with the computing device and/or following authentication of the user by the access device 100. User information 426 may also include other information, such as biometric or security data used by the access device 100 for authenticating the user.

Further, in some implementations, multiple users may share a single access device 100, with the user information 426 of each user being secure from access by the other users. For example, when a first user picks up the access device 100 for use, the first user provides biometric or other authentication information to authentication component 408. The access device 100 then provides the first user's access information 426 to a nearby computing device for accessing the first user's cloud data. On the other hand, when a second user picks up the access device 100 for use, the second user provides biometric or other authentication information to authentication component 408. The access device 100 then provides the second user's information 426 to the nearby computing device for accessing the second user's cloud data. Thus, the first user's user information 426 and cloud data are secure from the second user and vice versa.

Control module 428 may control the overall operation of the various components of the access device 100, such as for detecting motions and actions made by the user during use of the access device 100. For example, control module 428 may detect and register gestures, clicks, selections, grabs, releases, etc., and determine a proper output or response, such as sending instructions to a nearby computing device. Security module 430 may control user access to the access device 100, such as for obtaining biometric verification of the user or otherwise ensuring that the user is authorized to use the access device 100. Communication module 432 may establish and carry on communications with one or more computing devices within communication range of the access device 100 such as for transmitting instructions for accessing the user's data in the cloud environment, for transmitting user inputs for interacting with the user's data, and for receiving feedback messages from the computing device. Furthermore, in some implementations, communication module may include instructions for initiating the establishment of a virtual private network through the nearby computing device for ensuring security of the user's data in the cloud environment. The control module 428, security module 430, and communication module 432 may include a plurality of processor-executable instructions, which may comprise a single module of instructions or which may be divided into any number of modules of instructions. Such instructions may further include, for example, drivers for hardware components of the access device 100. Collectively these modules 428, 430 and 432 may be entirely or partially implemented on the device 100. In some implementations, the modules 428, 430 and 432 are implemented partially on another device or server.

Memory 404 or other machine-readable storage media stores one or more sets of instructions (e.g., software) embodying any one or more of the methodologies or functions described herein. The instructions may also reside, completely or at least partially, within the memory 404 and within the processor 402 during execution thereof by the access device 100. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., processor 402). The program code can be stored in one or more computer-readable memory devices or other computer-readable storage devices, such as memory 404.

Additionally, access device 100 may include one or more other sensors, such as for tracking an absolute position of the access device 100. For example, rather than relying merely on inertia measured by the accelerometers 412 for determining translation motion of the access device 100, the other sensors 434 may also provide an indication of a position and change in position of the access device 100. Examples of suitable other sensors 434 may include one or more cameras or image sensors, echolocation sensors, laser positioning sensors, and the like. For example, the other sensors 434 may be positioned on the bottom portion 302 of the access device 100 for tracking motion of the access device 100 to provide additional device position input for augmenting the inputs from the gyroscopes 410, accelerometers 412 and magnetic sensors 414. Further, while an example device configuration and architecture has been described, other implementations are not limited to the particular configuration and architecture described herein. Thus, this disclosure can extend to other implementations, as would be known or as would become known to those skilled in the art.

Example Framework

Figure 5:
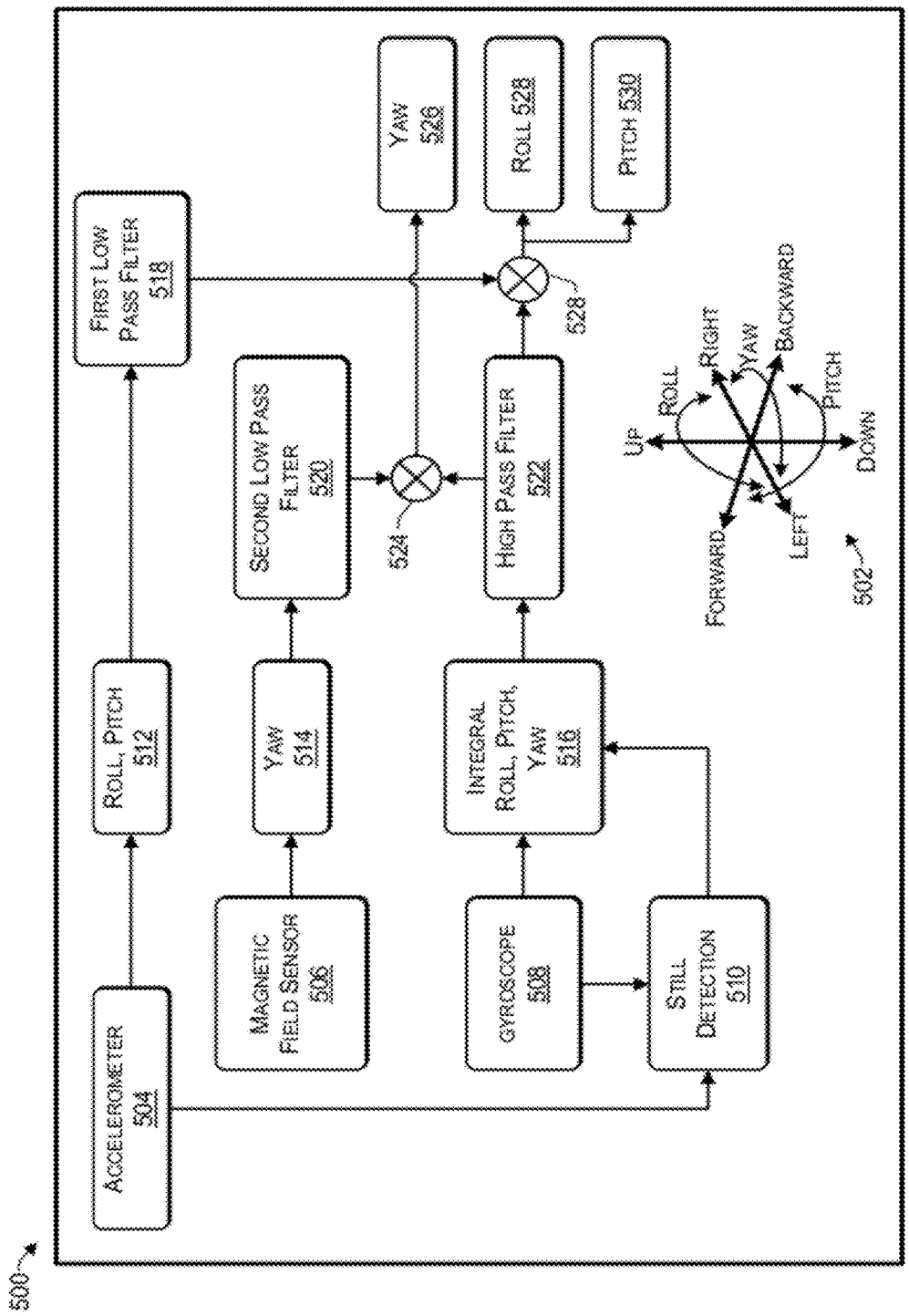
FIG. 5 is a block diagram of an example operation framework of an access device according to some implementations.

FIG. 5 illustrates an example of a framework 500 for determining angular movement and orientation of the access device 100 according to some implementations. For example, the position and orientation of access device 100 may be used to determine interaction with virtual objects in a user interface. As one example, given a 3D user interface and a position of a pointer displayed in the user interface, various interactions with the interface can be carried out based on detected actions, motions and gestures performed by the user with the access device 100. As illustrated by a graphic 502 of FIG. 5, the access device 100 enables operation with detection of movement in six degrees of freedom, e.g., forward/backward, up/down, left/right, roll, pitch, and yaw. The six DOF operation enables a user to navigate within, through and around diverse sets of information resources, such as 3D interfaces, 3D data sets, complex relationship representations, and the like. The six DOF operation of the access device 100 also may enable a user to navigate across multiple separate displays which, in some implementations, may be controlled by multiple separate computing devices.

The framework 500 may include a three-axis accelerometer 504, a three-axis magnetic field sensor 506 and a three-axis gyroscope 508. For example, the three-axis accelerometer 504 can provide an indication of translation motion, i.e., forward/backward, up/down, left/right (not shown in FIG. 5). The three-axis accelerometer 504 can also provide an accurate pitch and roll angle when the access device 100 is not otherwise in motion. Further, the three-axis magnetic sensor 506 may act as a compass to provide an absolute yaw angle, while the three-axis gyroscope 508 may detect changes in angular position along all three-axes with high speed. The framework 500 may be complemented by a filter algorithm to combine positions computed from the different sensors 504, 506 and 508. Additionally, in some implementations, MEMS type sensors may be used, such as for the three-axis accelerometer 506 and the three-axis gyroscope 508. However, in these types of internal measurement sensors, the mid-point of the accelerometers and gyroscopes may be related to temperature. Consequently, a change in the mid-point due to a change in temperature may lead to angle drift. To accommodate for this, the framework 500 includes a block 510 for stillness detection. Thus, when the access device 100 is still, implementations herein accumulate an average of gyroscope outputs and use this to periodically recalibrate the three-axis gyroscope. The three-axis accelerometer may be similarly recalibrated.

Yaw, pitch and roll may be determined based on the following equation:

$$(a_x-x_0)^2+(a_y-y_0)^2+(a_z-z_0)^2=G^2$$

where G is gravity, $x_0$ is the x-axis midpoint, $y_0$ is the y-axis midpoint and $z_0$ is the z-axis midpoint. Accordingly, three attitudes, yaw, pitch and roll may be determined based on the following equation:

$$(a_x^i-a_x^j)\cdot x_0+(a_y^i-a_y^j)\cdot y_0+(a_z^i-a_z^j)\cdot z_0=[(a_x^i)^2-(a_x^j)^2+(a_y^i)^2-(a_y^j)^2+(a_z^i)^2-(a_z^j)^2]/2$$

where i, j=1, 2, 3; and i≠j.

Consequently, accelerometers 504 provide a detected roll and pitch 512, while magnetic field sensor 506 provides a detected yaw 514. Furthermore, gyroscope 508 provides an integral detected roll, pitch and yaw 516. The roll and pitch 512 from the accelerometer 504 is provided to a first low pass filter 518, while the yaw 514 from the magnetic field sensor 506 is provided to a second low pass filter 520. The roll, pitch, and yaw 516 detected by the gyroscope 508 is provided to a high pass filter 522. The magnetic field sensor yaw 514 from the second low pass filter 520 is combined with the gyroscope yaw from the high pass filter 522 at node 524 to produce a final determination of yaw 526. Similarly, the gyroscope roll and pitch from the high pass filter 522 is combined with the roll and pitch from the first low pass filter 518 at node 528 to produce a final determination of roll 528 and pitch 530.

User Interface Interaction

A cloud computing environment allows a user store his or her data on one or more cloud servers or in other remote storage locations accessible over a network such as the Internet. The user can access his or her data without a specific client from any computing device having Internet access. The access device 100 herein may enable access to user data through practically any available computing device, and further provides for 3D interaction with the data in user interfaces in a cloud computing environment. A user interface architecture employed with the access device 100 may include various graphical representations of applications, items, files, sites, pages, services and other data that users may interact with via the access device 100. In some implementations, the graphical representations appear as virtual objects in the user interface. Additionally, in some implementations, the user interaction with the user interface is based on emulating an experience in which the user is inside the cloud computing environment.

Traditional user interfaces are based on input devices, such as a keyboard and mouse, in which the operational degrees of freedom are based on 2D space, e.g., up/down and left/right movement. On the other hand, the access device 100 herein supports 3D operations and provides six DOF. In addition, the access device 100 also supports grasping and holding operations based on the ability to detect a change in a grasping or squeezing pressure exerted on the access device. The user interface framework herein illustrates the advantages of the access device 100 over conventional control devices.

A current trend in user interface development is to make information clearer and more definite. For example, users have an ever-increasing amount of information available to them from different sources and in multiple dimensions. Consequently, it is desirable to present this large amount of data in a comprehensible manner in a user interface. Unlike the traditional mouse, some implementations of the access device 100 do not employ a conventional "translation and click" mode for interacting with a user interface. Instead, implementations herein use movement based on both hand and arm gestures and movement of the joystick mechanism 108, and further employ a grasping action for grabbing and dragging a virtual object. Consequently, some implementations employ grabbing and dragging objects to a hot zone to trigger further interactions. The grabbing and/or dragging actions can be coordinated with contemporaneous feedback, such as haptic feedback, sound, and/or light provided by the access device 100. Thus, the interaction of a user with virtual objects in a user interface becomes intuitive and natural.

Figure 6:
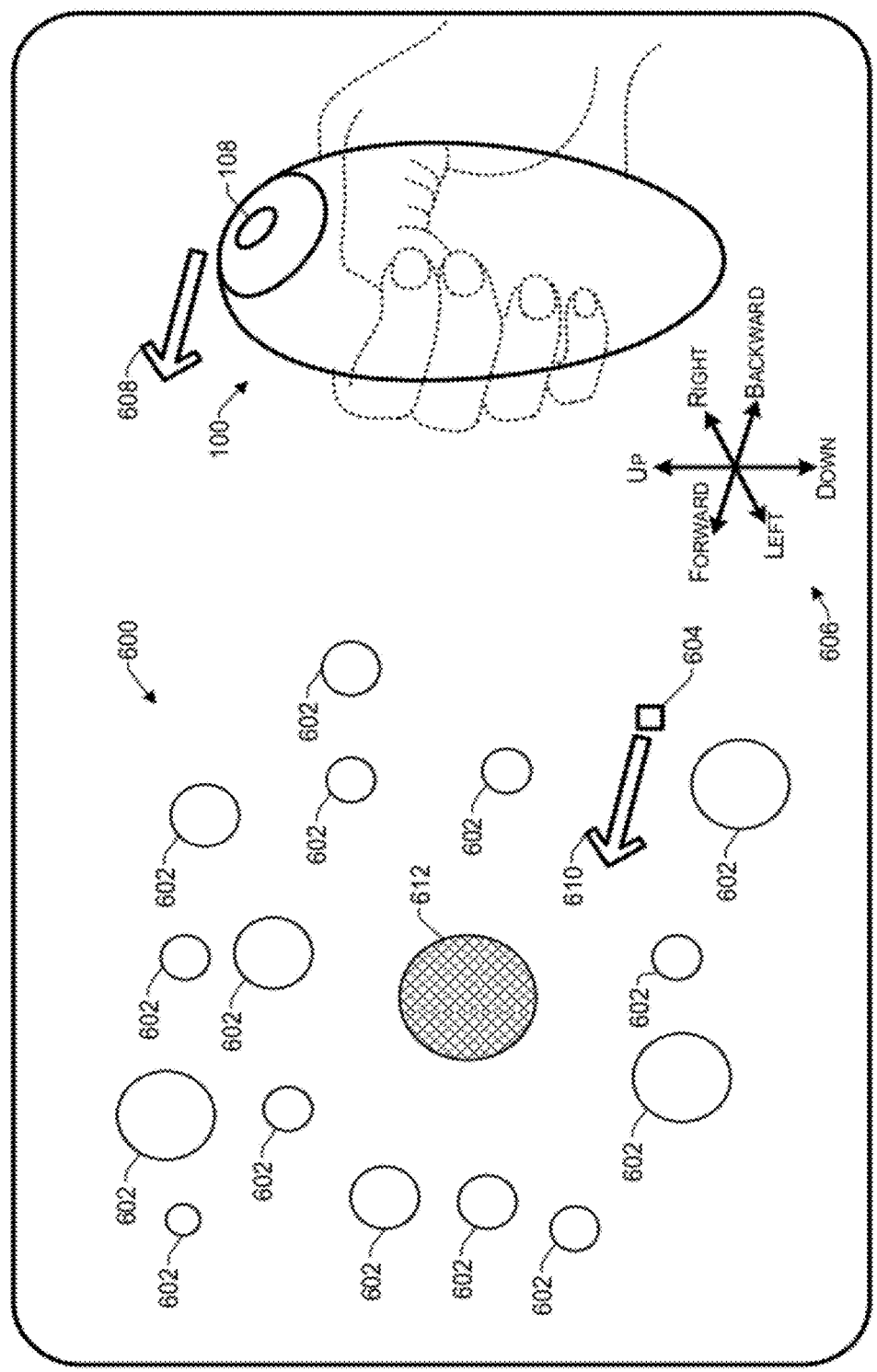
FIG. 6 illustrates interaction with a user interface by an access device according to some implementations.

FIG. 6 illustrates an example of employing the access device 100 for interaction with a user interface 600 according to some implementations. The user interface 600 may appear to the user to be a virtual 3D space containing a plurality of virtual items or objects 602. The virtual objects 602 may be representative of data items, applications, services, folders, people, or the like. A cursor or pointer 604 may also be represented in the user interface 600 for enabling interaction with select virtual objects 602. For example, the user may control the position of pointer 604 in the user interface 600 in three dimensions by a combination of hand gestures and manipulation of the joystick mechanism 108. For example, as illustrated in FIG. 6, by moving the access device 100 up/down, left/right, and forward/backward, as indicated by the graphic 606, the user may cause the pointer 604 to move in a similar direction in the user interface 600. For example, by moving the access device in the direction of arrow 608, the pointer 604 is moved in the user interface 600 in a corresponding direction indicated by arrow 610, such as to position the pointer 604 for interacting with one or more of the virtual objects 602. As is described additionally below, a user may grasp one of the objects 602 to select the object, and drag the object 602 into a hot zone 612 for further interacting with the selected object. For example, dragging an object 602 on to the hot zone 612 can cause the object 602 to open or otherwise become available for further interaction. The hot zone 612 may be a defined zone or area in the user interface 600 to which objects 602 may be dragged and automatically opened for further interaction. The hot zone 612 may or may not be visible or have a visible boundary in the user interface 600.

Figure 7:
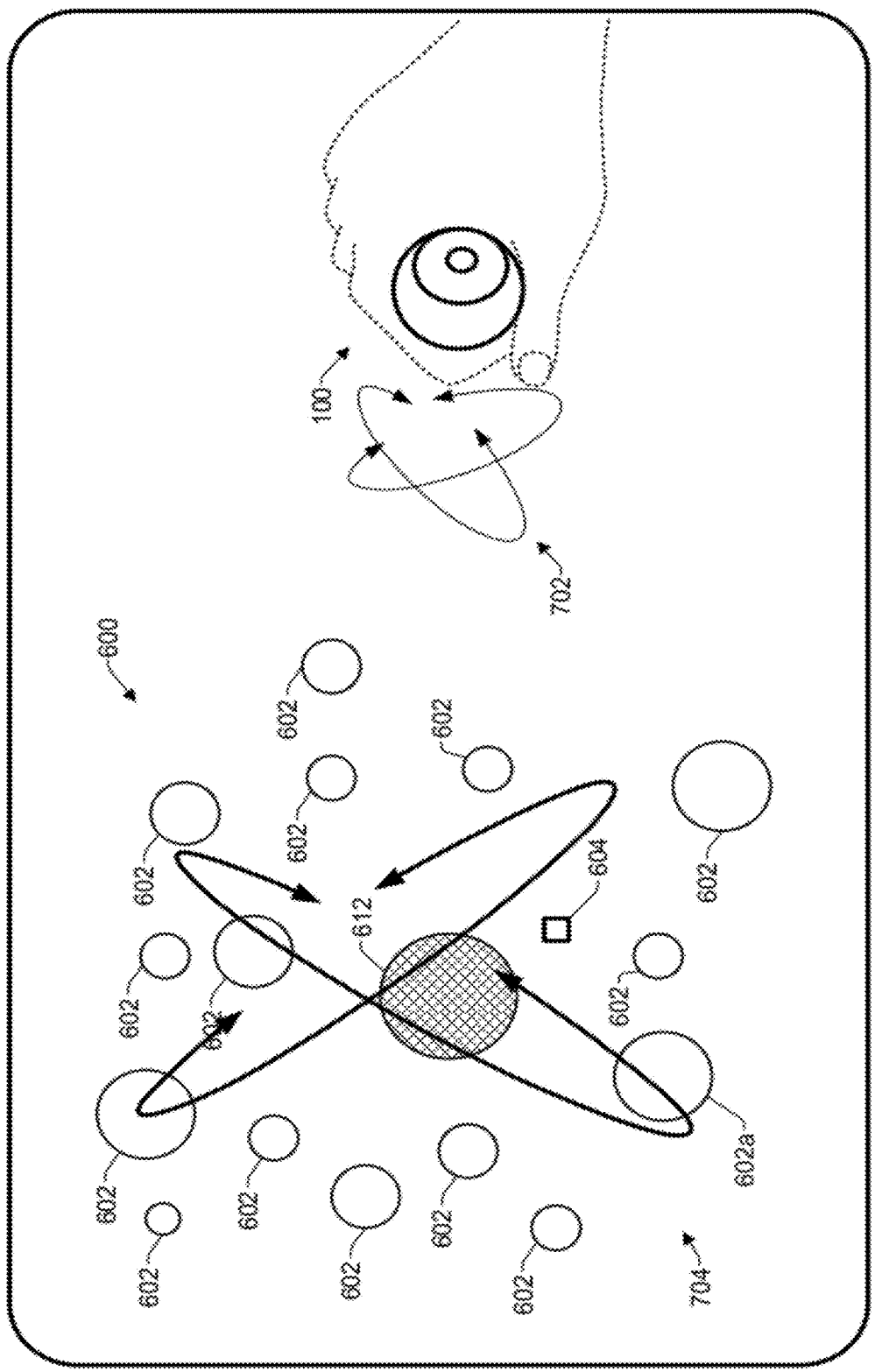
FIG. 7 illustrates interaction with a user interface by an access device according to some implementations.

As illustrated in FIG. 7, the access device 100 may be rotated, as illustrated by arrows 702, to perform a corresponding rotation of the user interface 600, as illustrated by arrows 704. For example, the access device 100 may be rotated according to any combination of roll, pitch, and yaw, and the rotation performed in the interface 600 corresponds to that performed by the access device 100. Furthermore, the rotation may be performed contemporaneously with translation of access device 100 as described above with reference to FIG. 6. In some implementations, the rotation of the user interface may be represented by a rotation of the point of view of the user interface about the pointer 604. For example, the access device may be rotated in any combination of roll, pitch or yaw, and the user interface, including the virtual objects 602 are rotated correspondingly about a particular point, such as the location of pointer 604. In one example, in the case in which a particular virtual object 602a is grabbed, as described additionally below, by positioning pointer 604 in contact with the particular virtual object 602a, the point of view of the user may be intuitively rotated about the particular virtual object 602a by rotating the access device 100. Further, the point of view may be zoomed in or out on the particular virtual object 602a either before, during or after the rotation of the point of view. Additionally, while the rotation may take place about the pointer in some implementations, in other implementations, the rotation may take place around other points in the user interface 600.

Figure 8:
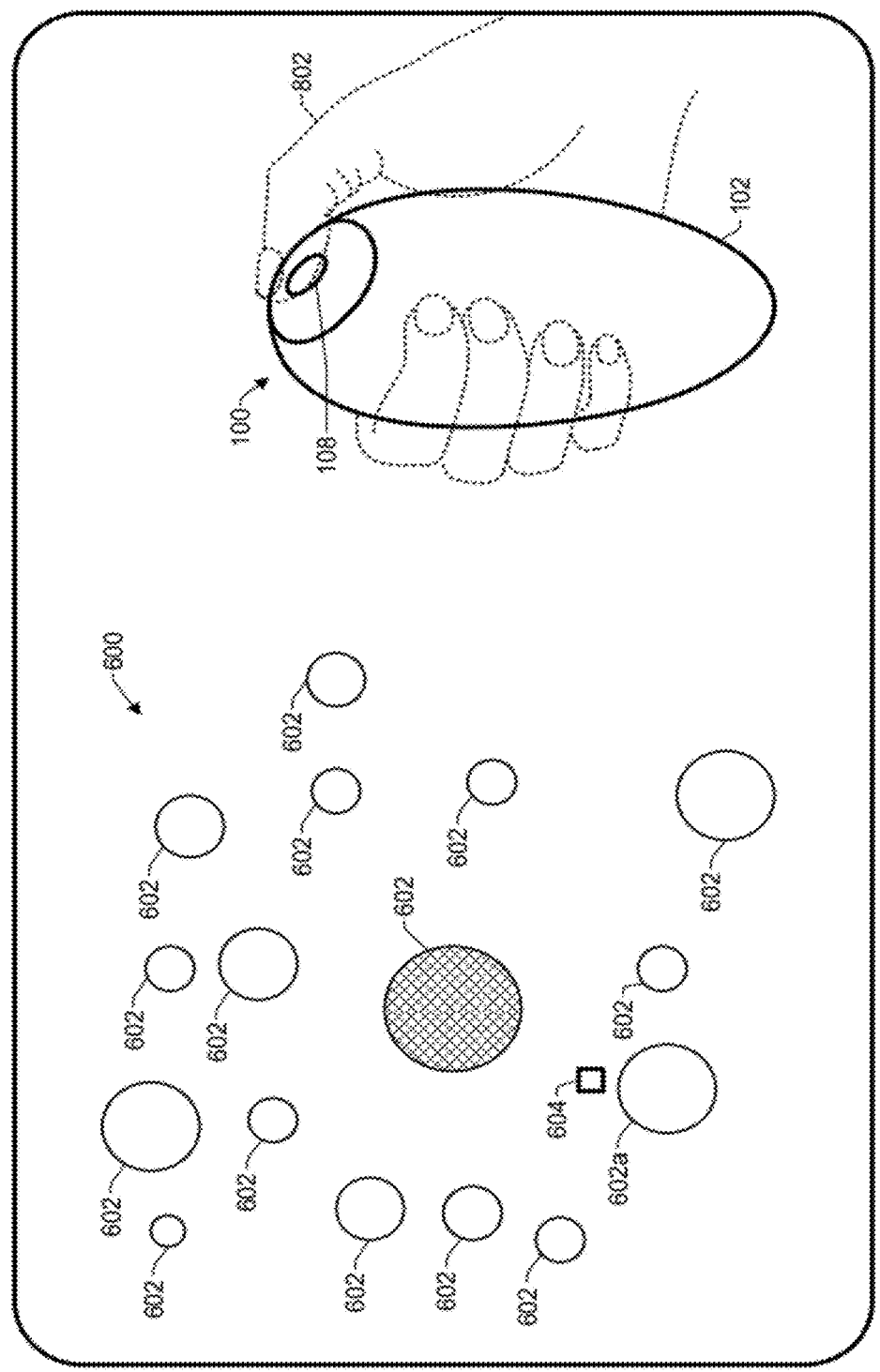
FIG. 8 illustrates interaction with a user interface by an access device according to some implementations.

As illustrated in FIG. 8, the position of the pointer 604 may be further controlled by the joystick mechanism 108 such as by movement with a user's thumb 802. The joystick mechanism 108 may be used for translation of pointer 604, and may be employed for precision movement of the pointer 604. For example, hand and arm gestures may be used for manipulating the pointer 604 in to initial proximity to a particular object 602a. The joystick mechanism 108 may then be used for fine-grained movement of the pointer 604 to bring the pointer 604 into coincidence with the particular object 602a.

Figure 9:
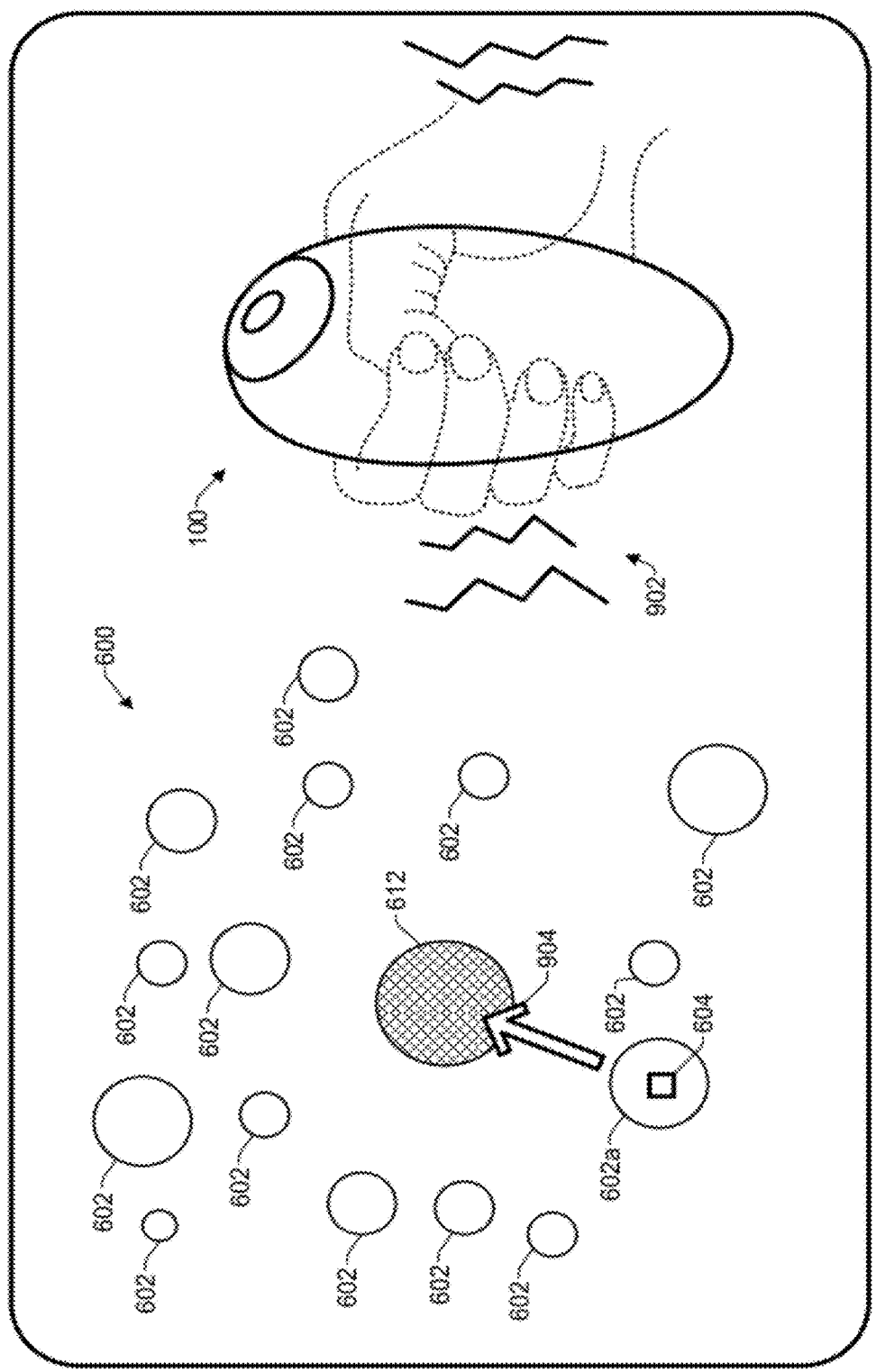
FIG. 9 illustrates interaction with a user interface by an access device according to some implementations.

As illustrated in FIG. 9, feedback 902 may be provided to a user by the access device 100 to indicate various interactions with the user interface 600. For example, when the virtual pointer 604 contacts or coincides with an object 602 in the user interface 600, such as the particular object 602a, a first type of feedback 902 may be provided, such as a vibration induced in the access device 100, a sound produced by the access device 100, a particular color of light emitted by the access device 100, or any combination thereof. When the user has manipulated the pointer 604 to intersect with a particular object 602a that the user desires to interact with, the user may grab the particular object 602a by increasing an amount of grip or grasping pressure on the access device 100. As described above, by squeezing the housing of the access device 100 past a predetermined threshold, as measured by the strain gauge 106, a grab action may be registered by the access device 100. A user may continue to maintain the grip in excess of the predetermined threshold to hold the particular object 602a for moving the particular object 602a from one location to another location in the user interface 600. For example, the user may drag the particular object 602a onto the hot zone 612, as illustrated by arrow 904. When the particular object 602a is successfully dragged onto the hot zone 612, the particular object 602a may be opened or otherwise activated, depending on the nature of the particular object 602a. For example, if the particular object 602a is an application, such as for an online service, the application may be opened or started. Similarly, if the particular object 602a is a set of digital images, dragging the particular object 602a onto the hot zone 612 may result in the set of images being opened for viewing.

The contact of the particular object 602a and the pointer 604 with the hot zone 612 may or may not trigger a second feedback indication from the access device 100 to the user. The second feedback indication may be the same as the first type of feedback described above, or may be somewhat different, such as a different vibration, different sound, different colored light, or the like. Additionally, feedback may also be provided for other events, such as when the pointer 604 encounters a virtual barrier, or the like. For example, when the pointer 604 reaches the edge of a display (not show in FIG. 9) that is displaying the user interface 600, another type of feedback may be provided by access device 100, such as different vibration, sound, light, etc. Furthermore, grabbing, holding, dragging and releasing an object may also cause various types of feedback to be produced by the access device 100 in some implementations. For example, as an object is being dragged, a continuous low-level vibration may be produced.

According to some implementations, a flinging type motion may be used for deleting a specific object 602 from the user interface 600. For example, once the user has grabbed a specific object 602, the user may perform a quick flinging motion while slightly loosen the grip on the access device 100. This may result in the specific object 602 being virtually "thrown" out of the user interface, and may effectively result in the specific object 602 being deleted, closed, or the like, depending on the object type and interface type. Confirmation of the deletion or closing of the object may be displayed to the user following the flinging motion. Various other user interactions that may be performed using the access device 100 will be apparent to those of skill in the art in light of the disclosure herein.

Some types of cloud computing services may utilize complex and dynamically created forms of visualization and rendering for enabling users to effectively understand and interact with presented information. For example, portions of a social network may be visualized geographically, temporally, in terms of frequency of contact, or as an amalgam of all data types, and may be recalculated and redisplayed in real time, dependent upon specific user desires and goals. Some examples of cloud services entail such things as presenting statistically produced measures of general user activity that can inform individual users of, e.g., the most common topic in a microblog feed at the current time or place; the most listened to or watched media at the current time; the most likely strength of bonds between friends; the most likely desired target in a web browsing or search activity; or historical and geographical renderings of digitally mediated activity that can be used to direct and inform web searches, acts of communications (messages, presence alerts, etc.), to name a few. Furthermore, individual users can benefit from these services and services of these types may take advantage of six DOF in a user interface by enabling visualization and interaction of complex relationships and structures represented by the services.

Figure 10A:
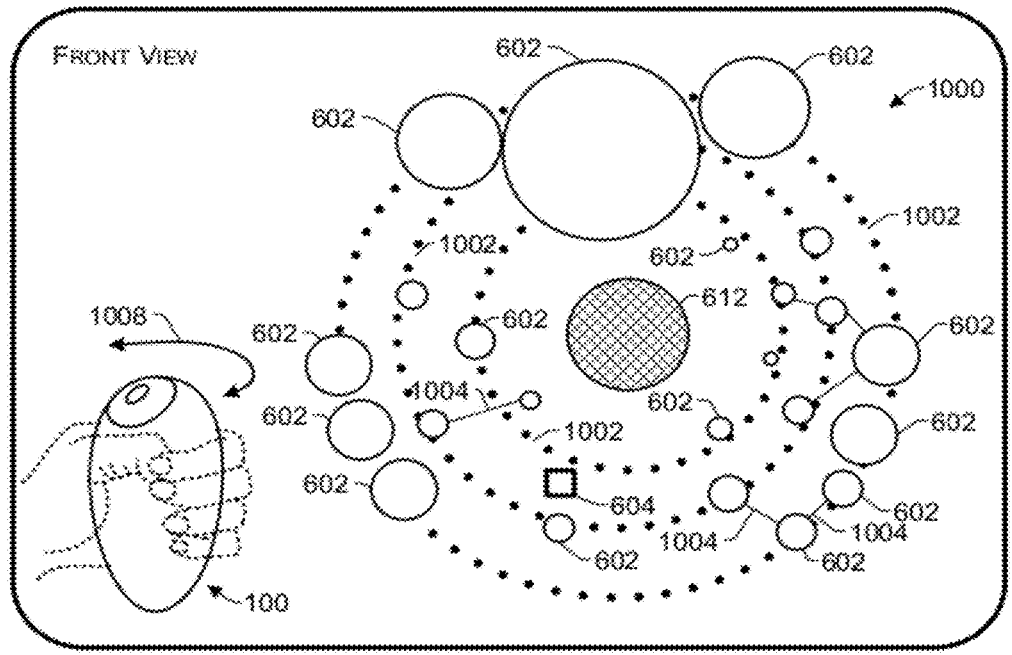
FIG. 10A-10B illustrate interaction with a user interface by an access device according to some implementations.
Figure 10B:
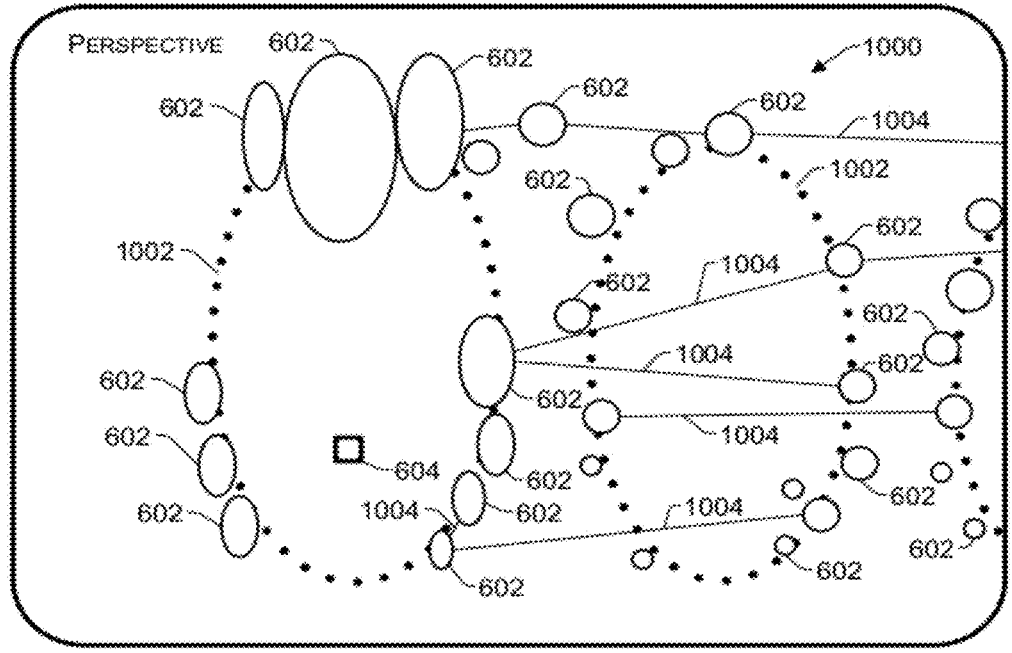

FIGS. 10A and 10B illustrate interaction of the access device 100 with another example of a 3D user interface 1000 according to some implementations, and which may be representative of cloud computing services. FIG. 10A illustrates an example of a front view of the user interface 1000. The user interface 1000 may include a plurality of virtual objects 602, as described above with reference to FIG. 6. The objects 602 may be arranged according to a hierarchy in a plurality of rings 1002 such that the user may advance the pointer 604 through the rings 1002 for navigating from one hierarchical level to the next. For example, as the pointer 604 advances inward in the user interface 1000, away from the user, the nearest ring 1002 may appear to move outward and past the user, so that the viewpoint of user appears to travel into the user interface 1000.

As one illustrative example, the user interface 1000 may be a task-oriented user interface framework, which hides the concept of individual applications. The objects 602 may represent tasks (e.g., action items, things to do, events, appointments, people to contact, etc.). Thus, the user may use the interface 1000 to focus on certain tasks. In this example, each ring 1002 may represent a unit of time, such as a day, week, month, etc. and each object 602 may represents task relevant to the particular unit of time. Consequently, if each ring 1002 represents a day, the user may travel through the rings 1002 represented in the user interface 1000 to view the objects 602 associated with each of the rings 1002 for a particular day. Accordingly, in addition to displaying conventional relations between data, such as sequence, contrast and apposition, the time relationship is also displayed in user interface 1000. As a result, the user interface 1000 may form a sort of time-based virtual tunnel that a user may advance through. For instance, the nearer the location of a ring 1002, the sooner in time the tasks or events are to be performed. Users can use the access device 100 to shuttle back and forth within the user interface 1000 to browse, control, re-arrange and edit the tasks, data, and so forth. Further, some implementations of the interface 1000 may include the hot zone 612, as described above for opening or activating objects 602.

Additionally, in some implementations, the user interface 1000 may be divided into separate work and personal portions. For example, in the work portion, e.g. on the upper half of the interface 1000, work items or objects may be located and classified according to type and priority. While in the personal portion, e.g., on the lower half of the user interface 1000, the objects 602 may be arranged according to contacts, gadgets, and the like. Further, some objects may communicate with other objects, may share information, etc. For example, a social network service may be part of the user interface 1000. Thus, connections or relationships between particular objects 602 may be displayed in the user interface 1000, such as by connectors 1004, to enable the user to visualize relationships between the different virtual objects 602.

As illustrated in FIG. 10B, owing to the multiple degrees of freedom that can be provided by access device 100, the user interface 1000 may be easily expanded or rotated to be viewed from other angles or points of view, such from a different perspective. This enables visualization of relationships between objects 602. For example a trend map of different tasks or events may then be intuitively perceived by the user. In order to view the user interface 1000 from another perspective or point of view, the user may simply rotate the access device 100, such as is illustrated by arrow 1008, to obtain a perspective view of the user interface 1000, as depicted in FIG. 10B. This assists the user in locating particular objects 602, visualizing relationships between objects 602, viewing objects 602 that may be obscured or not currently visible from the front view, viewing trends among objects 602, and so forth. Further, the perspective view may also assist in quickly determining the position of the pointer 604 within the user interface 1000 in relation to the objects 602 depicted in the user interface 1000.

With the access device 100, a virtual object can be grabbed, and the orientation of the viewpoint with respect to that virtual object may be altered through movement of the access device 100 through various of the available six DOF. Consequently, the movement and change in point of view of with respect to a virtual object is not confined to front, side and rear views. Rather, any point of view may be obtained using the access device 100 for creating any number of different renderings of the virtual object, or other virtual objects, in the user interface. As one example, a view from 'behind' a particular virtual object may be used to see the history of the virtual object. As another example, a view from 'the side' of the virtual object might display the relationships between the virtual object and users of the virtual object. Accordingly, by enabling a user to grab a virtual object and then alter the point of view taken on the virtual object implementations herein may enable a user to access an almost limitless number of different views and renderings of the virtual object. Consequently, by performing intuitive rotation actions carried out while holding the access device 100, the user is able to navigate through a complex three-dimensional user interface containing a large number of virtual data objects, representations, relationships, and the like.

Figure 11:
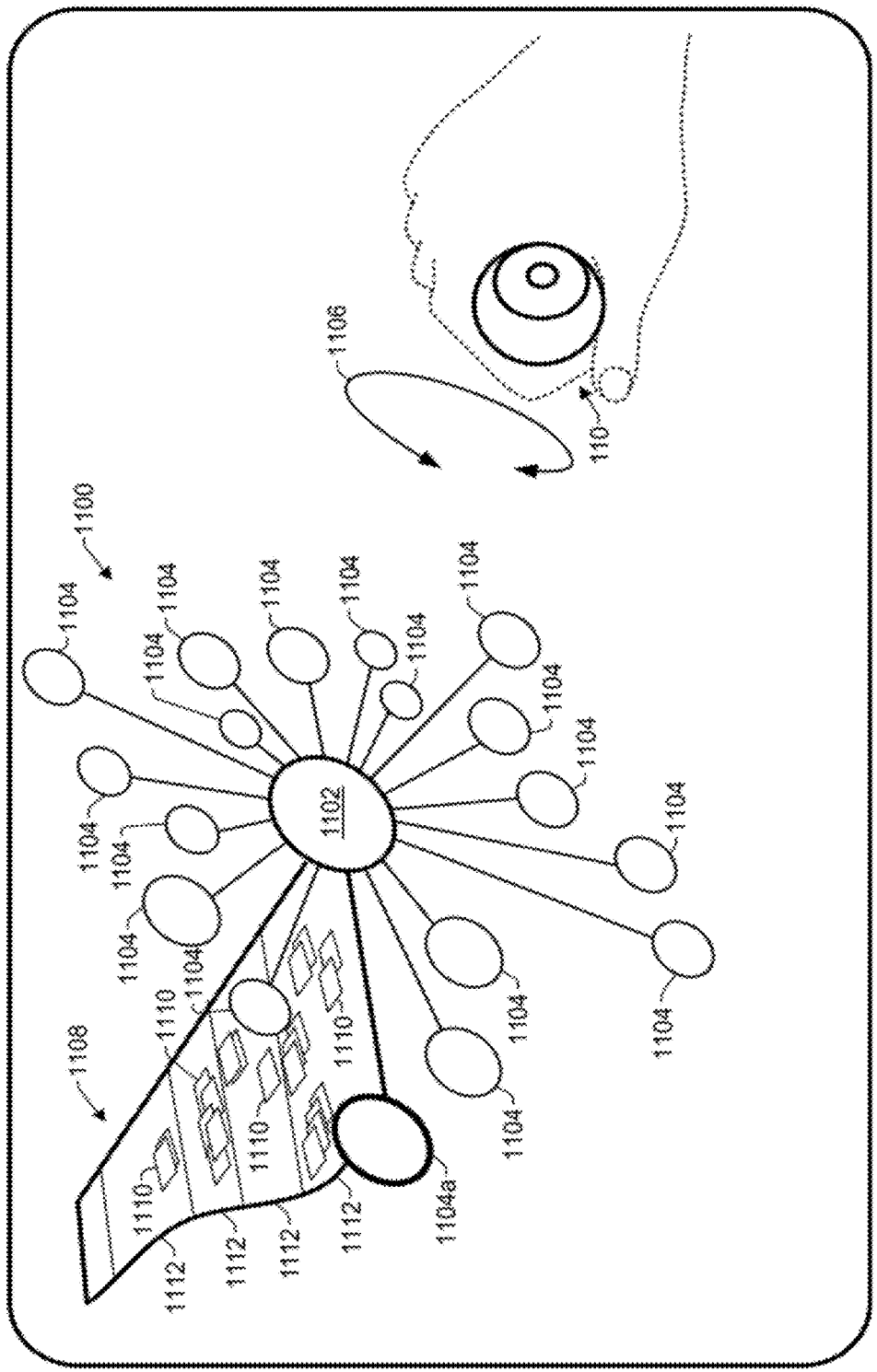
FIG. 11 illustrates interaction with a user interface by an access device according to some implementations.

FIG. 11 illustrates another example of a 3D user interface 1100 that the access device 100 may be configured to interact with according to some implementations herein. As an illustrative example, the interface 1100 may represent a social network with the user of the access device 100 represented as a center object 1102, and the user's friends or contacts represented as virtual objects 1104 connected to the center object 1102 and radially disposed about the center object. A particular object 1104a may be selected by rotating the user interface 1100 to a particular location, such as by rotating the access device 100, as illustrated by arrow 1106. Further, each object 1104 may include a 3D representation 1108 of information 1110 relevant to interactions between the user and the friend. For example, the 3D representation 1108 may be arranged according to segments of time 1112, or other suitable categories for categorizing the information 1110. For example, for the selected particular object 1104a, the information 1110 may be messages, wall posts, or the like, communicated between the user and the friend. The information may be categorized according to time, so that each segment 1112 may represent a week, month, year, or the like. Further, the amount of the information 1110 per segment 1112 may affect the size of the segment, so that the representation 1108 increases or curves outward in a radial direction based on larger amounts of information 1110. Thus, those friends that the user has communicated with most frequently during the recent time period would have the largest representation 1108. Further, the size of the particular object 1104a in the user interface 1100 may reflect this frequency of communication by being of a large size than some other objects 1104a in the user interface 1100 having lesser amounts of communication. The user may perform further rotation of the user interface 1100, as described above with reference to FIGS. 10A and 10B, to rotate the user interface 1100 to a perspective view to further interact with the information 1110 associated with the particular object 1104a.

Figure 12:
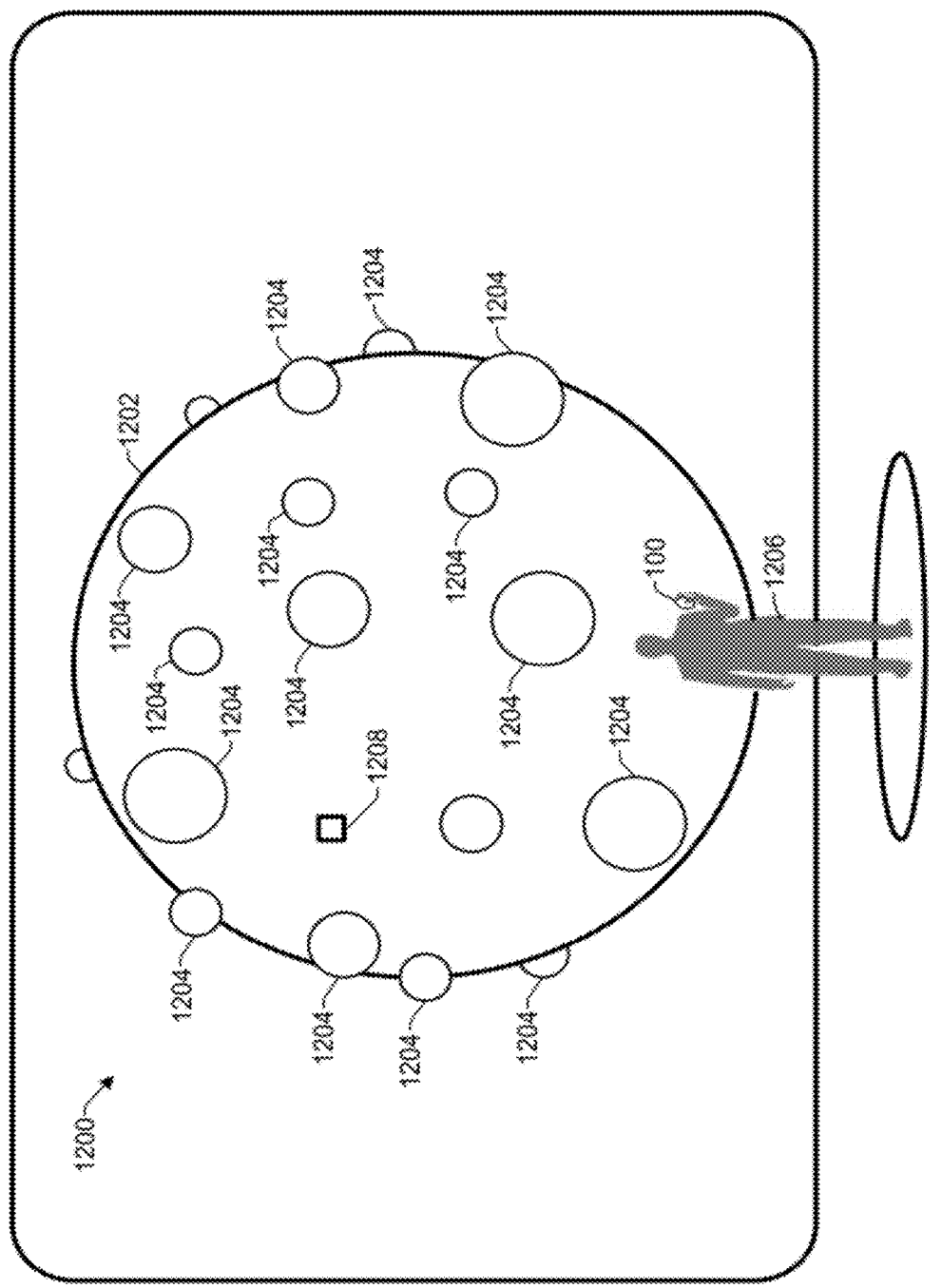
FIG. 12 illustrates interaction with a user interface by an access device according to some implementations.

FIG. 12 illustrates another example of a 3D user interface 1200 that the access device 100 may be configured to interact with according to some implementations herein. As an illustrative example, the user interface 1200 may include a representation of the world, such as a globe 1202, and each virtual object 1204 may represent one or more locations, one or more events taking place at a particular location, etc. The user 1206 may rotate the access device 100 in the manner described above, to rotate the globe 1202 and objects 1204 in a direction corresponding to the rotation of the access device 100. The user may use a pointer 1208 as described above to select a particular object 1204 to interact with the particular object. In some implementations, the user interface 1200 may include a hot zone (not shown), as described above, while in other implementations, the user may select a virtual object 1204, by double squeezing the access device 100, pressing down on the joystick mechanism 108, or by other suitable selection indication. Furthermore, while various examples of user interfaces have been described, implementations herein are not limited to the particular examples described, and may be extended to additional configurations of user interfaces, as will be apparent to those of skill in the art in light of the disclosure herein.

Example System Architecture

Figure 13:
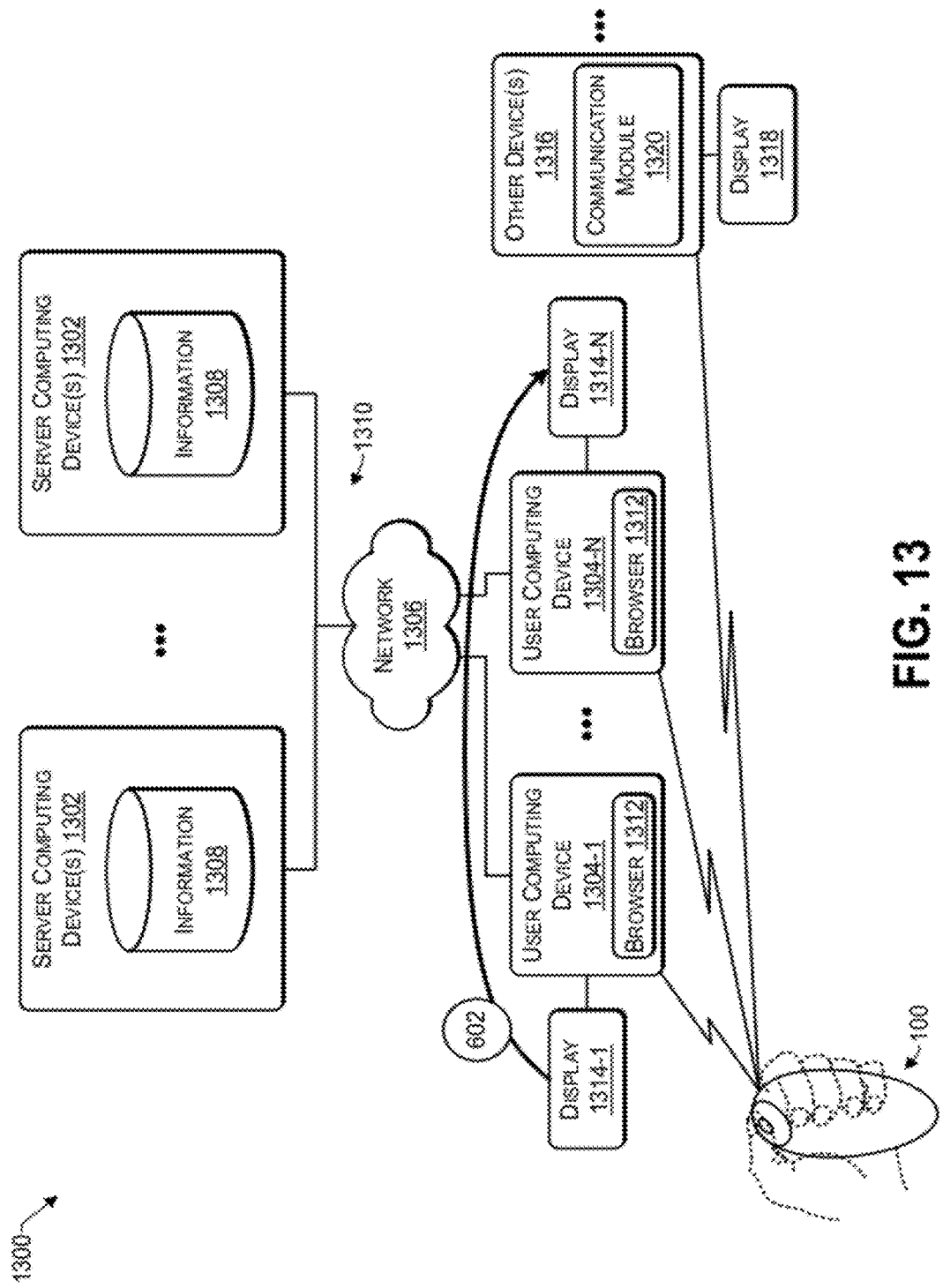
FIG. 13 illustrates a system architecture for interaction with an access device according to some implementations.

FIG. 13 is a block diagram of an example of a suitable system architecture 1300 that may be used with the access device 100 according to some implementations. In the illustrated example, architecture 1300 includes at least one server computing device 1302 able to communicate with one or more user computing devices 1304-1, . . . , 1304-N through a network 1306. For example, network 1306 may be the Internet or other suitable communication network enabling communication between at the least one server computing device 1302 and a least one user computing device 1304. The at least one server computing device 1302 may include information 1308 for providing a cloud computing environment 1310. For example, information 1308 may include user data, user services, cloud services, websites, and other information that the user stores or accesses in the cloud computing environment 1310.

Some implementations of the user computing devices 1304 may include a browser 1312 or other application for communicating with the server computing devices 1302, such as for accessing the user's information in the cloud computing environment 1310. For example, the browser 1312 may include a communication module, a security module (not shown in FIG. 13), and the like for enabling the access device 100 to securely access and interact with the information 1308 in the cloud computing environment 1310. For example, in some implementations it may be desirable to establish a secure communication, such as a virtual private network between the user computing device 1304 and the cloud computing environment 1310 for protecting the user's data. Further, in some implementations, it may be desirable to isolate the user's data from the remainder of user computing device 1304, such as for privacy and security.

Each user computing device 1304 may include an associated display 1314, e.g., 1304-1, . . . , 1304-N, for displaying the information 1308 accessed by the access device 100, such as in the user interfaces described herein. For example, each display 1314 may be a 2D or 3D display device such as an LCD (liquid crystal display), plasma display, OED (organic electroluminescent display), CRT (cathode ray tube) display, projector display, or the like.

Additionally, in some implementations the access device may communicate and interact with other devices 1316, which may or may not be in communication with a network. Other devices 1316 may be computing devices, digital picture frames, televisions, or other devices having a display 1318 associated therewith. The other devices 1316 may include a communication module 1320 or an application for facilitating wireless communication with the access device 100. For example, in some implementations, the other device 1316 may be a computing device having the user's information stored thereon and able to be accessed and interacted with using the access device 100 in the manner described above. Thus, the access device 100 may be used to access and interact with local information stored on the other devices 1316, as well as accessing remote information stored in the cloud computing environment 1310 through user computing devices 1304. Another example of the other devices 1316 may include a digital picture frame or other display device able to communicate wirelessly with the access device 100, but otherwise having a minimal interface, such as for merely displaying images.

In some implementations, the access device 100 may be in communication with more than one device at a time. For example, the access device 100 may be in communication with a first user computing device 1304-1 having a first display 1314-1 and a second user computing device 1304-N, having a second display 1314-N. In some implementations, the user may use the access device 100 to grab an object 602, as described above, displayed on the first display 1314-1 of the first computing device 1304-1 and drag the object 602 onto the second display 1314-N of the second computing device 1304-N, such as by using an arm or hand gesture simulating dragging the object from the first display 1314-1 to the second display 1314-N.

For example, in a first implementation, the object 602 may be transferred from the first computing device 1304-1 to the second computing device 1304-N through network 1306 using a network connection of each computing device. Thus, when the user drags the object 602 onto the second display 1314-N of the second computing device 1304-N, the second computing device 1304-N may be provided by the access device with information for obtaining the object 602, such as a network address of a network location of the object, or a network address of the first computing device, etc.

In an alternative implementation, the object 602 may be transferred from the first computing device 1304-1 to the second computing device 1304-N directly through the access device 100. For example, based on detected movement and position of the access device 100, the control module 428 of the access device 100 may detect that the object has been virtually dragged from the first display 1314-1 to the second display 1314-N. In response to detection of the drag action, the control module 428 may upload the object 602 through wireless communication from the first computing device 1304 to the access device 100, may then download the object 602 to the second computing device 1304 for display on the second display 1314. Objects may be similarly dragged to and from the displays 1318 of other devices 1316.

In yet another implementation, when a communication link exists between the first computing device 1304-1 and the second computing device 1304-N, such as a LAN, Wi-Fi connection, near field wireless connection, or the like, the object may be transferred directly by this connection. For example, when the first computing device 1304-1 and the second computing device 1304-N are part of the same LAN, when the control module detects the drag action, the control module 428 may send an instruction to the second computing device 1304-N to download the object from the first computing device 1304-1 over the LAN.

While the foregoing sets forth an example of a system architecture 1300 in which the access device 100 herein may be implemented, this is merely one example of a possible system architecture. Accordingly, implementations herein are not limited to any particular system configuration.

Accessing Information

Figure 14:
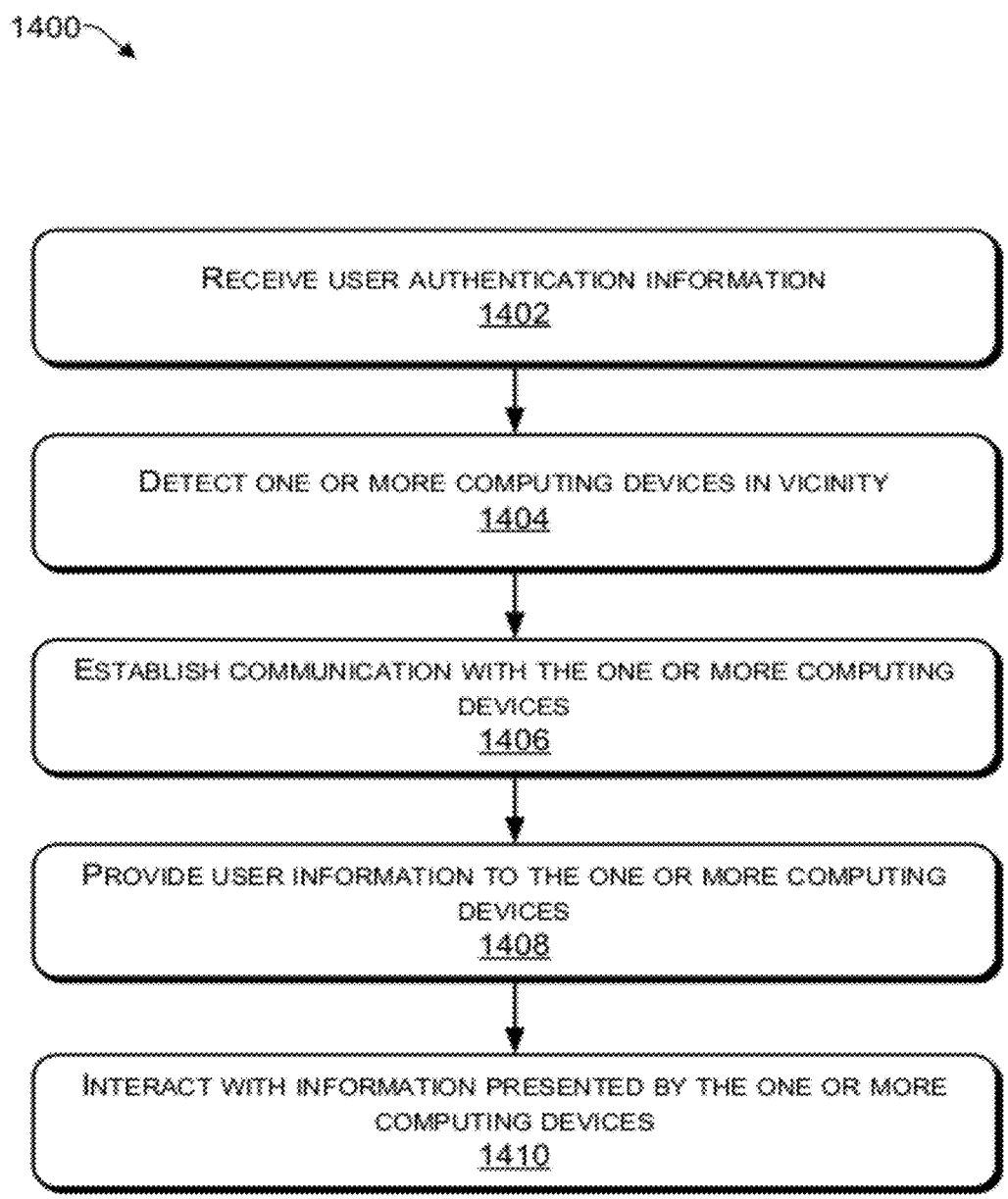
FIG. 14 is a flow diagram of an example process for accessing information according to some implementations.

FIG. 14 is a flow diagram of an example process 1400 for accessing information with the access device 100 herein according to some implementations. In the flow diagram, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, components, data structures, and the like that perform particular functions or implement particular abstract data types. The order in which the blocks are described is not intended to be construed as a limitation, and any number of the described operations can be combined in any order and/or in parallel to implement the process. For discussion purposes, the process 1400 is described with reference to the access device 100 of FIG. 1, although other devices, systems, frameworks, and environments may implement this process.

At block 1402, user authentication information is received by the access device 100. For example, before a user may use the access device 100, the user provides an authentication, such as biometric information, a password, or the like.

At block 1404, the access device 100 detects one or more computing devices in the vicinity. For example, the access device 100 may detect a computing device, such as one of computing devices 1304, which can be utilized by the user to access the user's remote information. The access device 100 may inform the user of this by one or more sounds. For example, the access device 100 may generate artificial speech indicating that one or more available computing devices are within range of the access device 100.

At block 1406, the access device 100 establishes communication with the one or more detected computing devices. For example, the access device 100 may establish a secure communication with the computing device, such as through a wireless communication protocol. Further, in some implementations, the order of the authentication and the detecting and establishing of the communication may be reversed for example, the access device 100 may detect and establish communication with an available computing device when within communication range of the available computing device, and the user may subsequently provide authorization information. In some implementations, the access device 100 may be configured to only establish communication with computing devices within close proximity to the user, such that a display associated with the computing device is viewable by the user. However, in other implementations, the access device may establish communication with a nearby computing device and then inform the user of the location of the display associated with the computing device.

At block 1408, the access device 100 provides user information to the computing device with which communication has been established. For example, the access device 100 may wirelessly communicate user information to the computing device, such a location of user data and services to be accessed on a network, such as the Internet. The user information may also include a variety of user preferences and settings for displaying the user data and services, such as a preferred interface configuration, color preferences, background preferences, and so forth. Additionally, in some implementations, the access device 100 may one or more modules, plug-ins, add-ons, or the like, to the computing device, such as for ensuring that the computing device is able to interact with the access device 100 and securely access and display the user's data and services.

At block 1410, the access device 100 interacts with the user data and services presented by the computing device. For example, the computing device may display a user interface presenting the user's data and services. The access device 100 may then send additional instructions for interacting with the user interface based on detected actions of the user. Further, as discussed above, the access device 100 may be in communication with more than one computing device at a time for interacting with multiple related or unrelated interfaces displayed by multiple related or unrelated computing devices.

The above process for accessing information may be implemented in a number of different environments and situations. For example, the access device may access one or more of the other devices 1316 using a similar access technique for accessing data thereon. Further, while several examples are described herein for explanation purposes, the disclosure is not limited to the specific examples, and can be extended to additional devices, environments, applications and settings.

Interacting with Information

Figure 15:
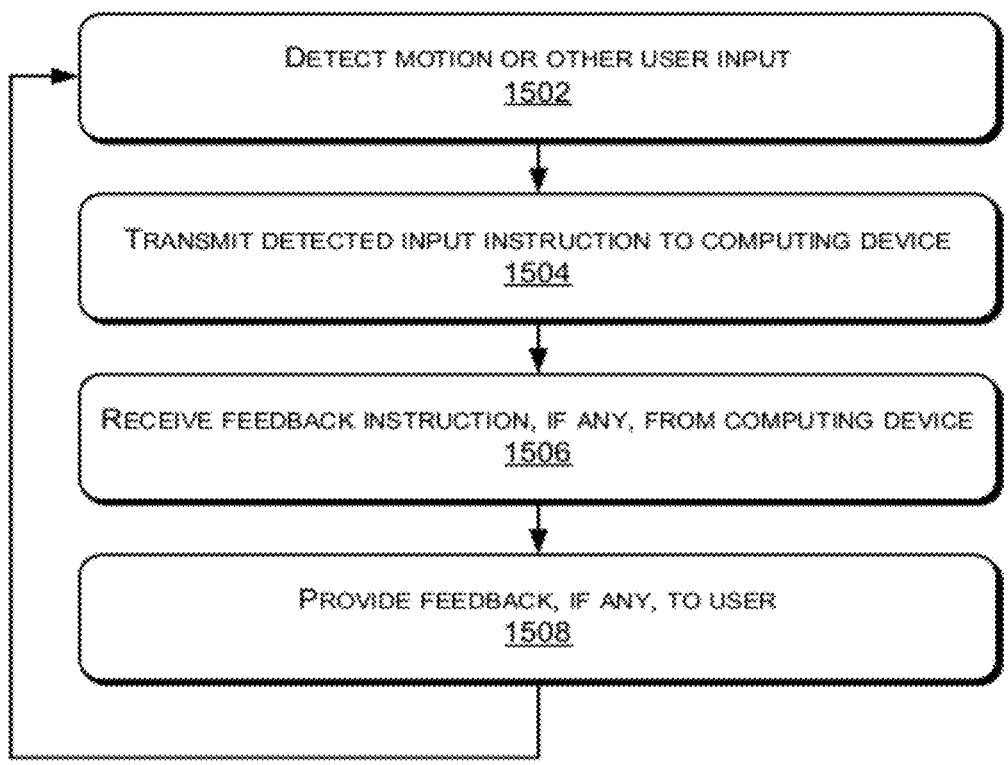
FIG. 15 is a flow diagram of an example process for interacting with information according to some implementations.

FIG. 15 is a flow diagram of an example process 1500 for interacting with the user's information according to some implementations herein. In the flow diagram, each block represents one or more operations that can be implemented in hardware, software, or a combination thereof. In the context of software, the blocks represent computer-executable instructions that, when executed by one or more processors, cause the processors to perform the recited operations. The order in which the blocks are described is not intended to be construed as a limitation, and any number of the described operations can be combined in any order and/or in parallel to implement the process. For discussion purposes, the process 1500 is described with reference to the access device 100 of FIG. 1, although other devices, systems, frameworks, architectures and environments may implement this process.

At block 1502, the access device 100 registers an input from the user. For example, the access device may detect that the user has moved or rotated the access device 100, has squeezed the access device 100 past the predetermined threshold to indicate a grab, has moved the joystick mechanism, and so forth.

At block 1504, the access device may transmit an instruction to the computing device based on the detected input. For example, the instruction may instruct the computing device to move the pointer 604 in a displayed user interface, rotate the user interface, execute a grab, drag, release, etc., as described above.

At block 1506, the computing device may send feedback to the access device 100 if an event warranting feedback has occurred in the user interface. For example, as described above, feedback may be provided if the pointer 604 has contacted a virtual object 602, has collided with an interface feature, or during other such events.

At block 1508, if the computing device provided a feedback message to the access device 100, the access device 100 may generate suitable feedback, depending on the particular nature of the feedback event. For example, the feedback may include any one of haptic feedback, sound, or light. The process then returns to block 1502 for detection of additional inputs from the user.

Computing System Environment

Figure 16:
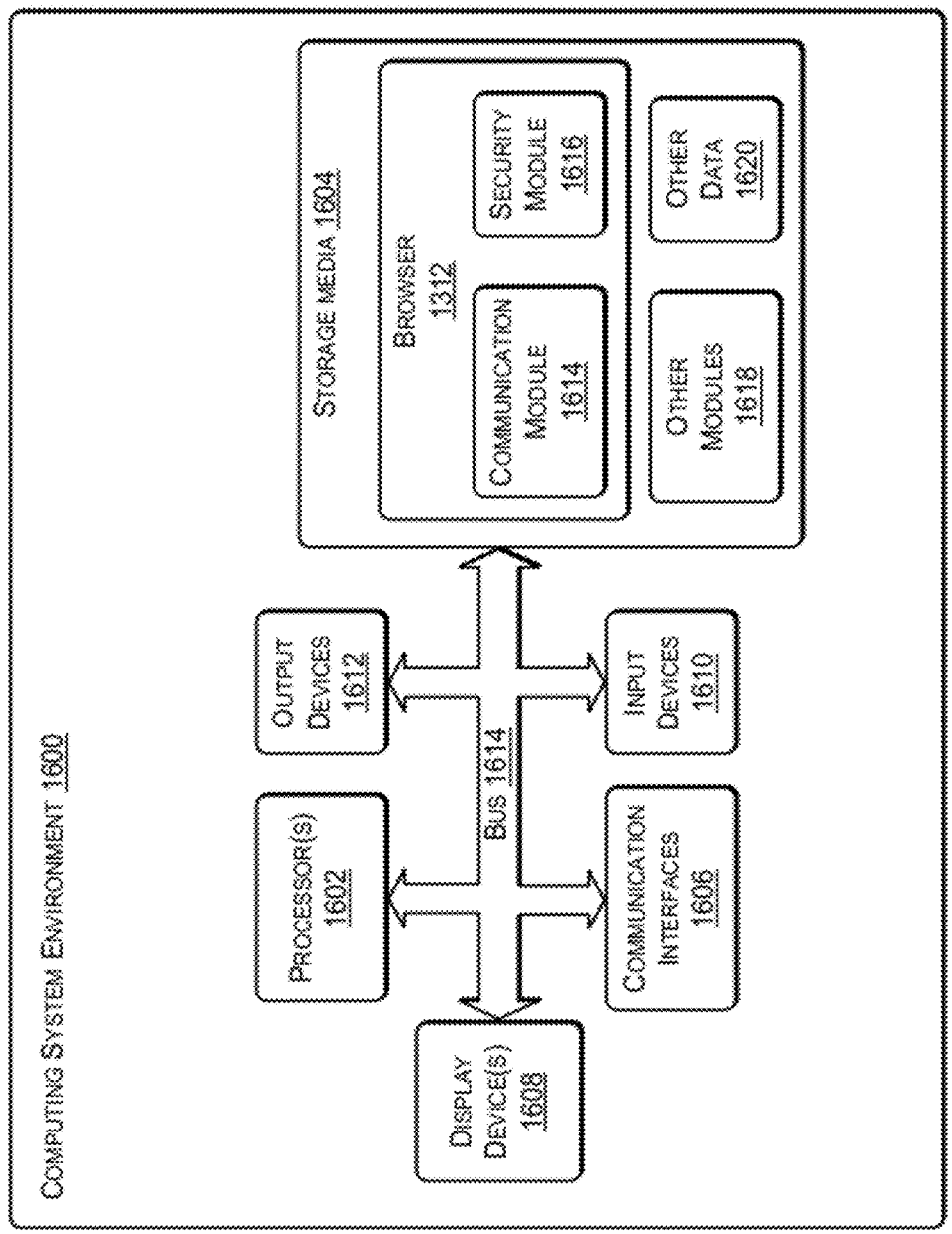
FIG. 16 is a block diagram of an example of a suitable computing system environment according to some implementations.

FIG. 16 illustrates an example configuration of a suitable computing system environment 1600 according to some implementations herein. The computing system environment 1600 may correspond to some implementations of the user computing devices 1304 of FIG. 13, although the user computing devices 1304 are not limited to the example configuration. Further, the computing system environment 1600 may correspond to some implementations of the other devices 1316. Computing system environment 1600 may include at least one processor 1602, storage media 1604, communication interfaces 1606, at least one display device 1608, input devices 1610, and output devices 1612, all able to communicate through a system bus 1614 or other suitable connection.

The processor 1602 may be a single processing unit or a number of processing units, all of which may include single or multiple computing units or multiple cores. The processor 1602 can be implemented as one or more microprocessors, microcomputers, microcontrollers, digital signal processors, central processing units, state machines, logic circuitries, and/or any devices that manipulate signals based on operational instructions. Among other capabilities, the processor 1602 can be configured to fetch and execute computer-readable instructions stored in the storage media 1604.

Storage media 1604 is an example of computer-readable storage media for storing instructions which are executed by the processor 1602 to perform the various functions described above. For example, storage media 1604 may generally include memory and memory devices, such as both volatile memory and non-volatile memory (e.g., RAM, ROM, or the like). Further, storage media 1604 may also include one or more mass storage devices, such as hard disk drives, solid-state drives, removable media, including external and removable drives, memory cards, Flash memory, floppy disks, optical disks (e.g., CD, DVD), storage arrays, storage area networks, network attached storage, or the like, or any combination thereof. Storage media 1604 may be collectively referred to as memory or computer-readable storage media herein. Storage media 1604 is capable of storing computer-readable, processor-executable instructions as computer program code that can be executed on the processor 1602 as a particular machine configured for carrying out the operations and functions described in the implementations herein.

Storage media 1604 may include the browser 1312 or other module, which can be executed on the processor 1602 for implementing interaction with the access device 100 described herein. In some implementations, the browser 1312 may include a communication module 1614 and a security module 1616. For example, the communication module 1614 and security module 1616 may be part of a plug-in, add-on, or integral portion of browser 1312, for enabling the access device 100 to communicate with the browser 1312 and access the user's information through the browser 1312. In some implementations, the communication module 1614 enables the access device 100 to access and communicate with the browser 1312 on a user computing device 1304 for controlling functions of the browser and for displaying and interacting with a user interface. Furthermore, security module 1616 ensures the security of communication between the access device 100, the user computing device, and the cloud computing environment containing the user's information. For example, the security module 1616 may establish a virtual private network or other secure communication link between the access device 100 and the user's information. The security module 1616 may further isolate the user's data from the other modules of computing system 1600 for protecting and securing the user's data. In some implementations, some or all of the security module 1616 may be received from the access device 100 when the access device 100 establishes communication with a client computing device 1304. Further, storage media 1604 may include other modules 1618, such as an operating system, device drivers, and the like, as well as other data 1620, such as data used by the other modules 1618. In addition, in other implementations, rather than a browser 1312, an application or other software may be provided on computing system 1600 for communicating with the access device 100 and for presenting user data in a user interface.

The computing system environment 1600 can also include one or more communication interfaces 1606 for exchanging data with other devices, including the access device 100, such as via a network, direct connection, radio frequency communication, infrared communication, and so forth. The communication interfaces 1606 can facilitate communications with a wide variety of networks and protocol types, including wired networks (e.g., LAN, cable, etc.) and wireless networks (e.g., WLAN, cellular, satellite, etc.), the Internet and the like. Additionally, in some implementations, communication interfaces 1606 may include a Universal Serial Bus (USB) port that receives a communication device configured to communicate wirelessly with the access device 100.

The display device(s) 1608, may be any known display device such as an LCD or CRT monitor, television, projector, touch screen or other display or screen able to display a 2D or 3D image. Output devices 1610 may include various types of output devices in addition to display device 1608, such as speakers, printers, and the like. In addition input devices 1612 may include various input devices in addition to the access device 100, such as a mouse, a keyboard, a remote controller, a camera, a microphone, a joystick, and so forth.

The example environments, systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer-readable storage devices. Thus, the processes, components and modules described herein may be implemented by a computer program product.

Although illustrated in FIG. 4 as being stored in memory 404 of access device 100, control module 428, security module 430 and communication module 432, or portions thereof, may be implemented using any form of computer-readable media that is accessible by access device 100. Computer-readable media may include, for example, computer storage media and communications media. Computer storage media is configured to store data on a non-transitory tangible medium, while communications media is not.

As mentioned above, computer storage media includes volatile and non-volatile, removable and non-removable media implemented in any method or technology for storage of information, such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium that can be used to store information for access by a computing device.

In contrast, communication media may embody computer readable instructions, data structures, program modules, or other data in a modulated data signal, such as a carrier wave, or other transport mechanism.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

CONCLUSION

Implementations herein provide an access device 100 for accessing and interacting with presented information in a 3D manner including pointing operations, intuitive grasping interaction, and tangible feedback. For example, the access device 100 may serve as an input/output device able to interact with a user interface with six DOF for enabling a user to navigate within, across and around the diverse sets of information resources, such as those available in a cloud computing environment. Thus, the access device may act as a user's physical key for accessing cloud data, and may include an authorization component to enable users to securely access their personal cloud data and services. The access device 100 may enable users to link to their cloud information and services through the nearest available display.

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
  detecting by an access device a first rotation of the access device;
  transmitting by the access device to a computing device, information about the first rotation of the access device, the information about the first rotation of the access device causing a corresponding first rotation of a point of view of a graphical user interface (GUI) about a cursor;
  subsequent to the transmitting by the access device the information about the first rotation of the access device, detecting, by a strain sensor of the access device an amount of strain produced by squeezing of the access device;
  determining that the amount of strain is above a first predetermined strain threshold;
  detecting, by the access device, a second rotation of the access device subsequent to detecting by the strain sensor of the access device an amount of strain produced by squeezing of the access device, the access device being configured to detect movement in six degrees of freedom including forward/backward, up/down, left/right, roll, pitch, and yaw;
  transmitting, by the access device, to the computing device, information that includes an instruction to cause grabbing of a virtual object in the GUI in response to the detecting by the access device, that the amount of strain is above the first predetermined strain threshold, and rotating the virtual object in the user interface in response to the detecting, by the access device, the second rotation of the access device; and
  subsequent to the transmitting; by the access device; to the computing device, the information that includes the instruction to cause grabbing:
  detecting by the strain sensor a second amount of strain produced by squeezing of the access device that remains above the first predetermined threshold, and in response to detecting the second amount of strain, transmitting to the computing device, information that includes an instruction to cause holding of the virtual object.

2. The method according to claim 1, further comprising:
  receiving a feedback message from the computing device, the feedback message indicating that a pointer of the user interface contacts the virtual object in the user interface; and
  generating, by the access device, feedback based on the feedback message, the feedback comprising at least one of tactile feedback, a sound, or activation of a light.

3. The method according to claim 1, further comprising:
  detecting additional movement of the access device subsequent to the transmitting the information that includes an instruction to cause grabbing of the virtual object;
  detecting that the amount of strain continues to exceed the first predetermined strain threshold; and
  transmitting an indication of the additional movement to the computing device, wherein the transmitting includes sending an instruction to move the virtual object in the user interface corresponding to the additional movement.

4. The method according to claim 3, wherein:
  the additional movement is detected as a flinging action followed by a level of strain below the first predetermined strain threshold; and
  as a result of detecting that the additional movement is the flinging action followed by the level of strain below the first predetermined strain threshold, an instruction is sent to remove the virtual object from the user interface.

5. The method according to claim 3, wherein the transmission of the indication of the additional movement to the computing device further includes sending an instruction for moving the virtual object onto a defined zone in the user interface.

6. The method according to claim 1, further comprising:
  detecting third rotation of the access device subsequent to the transmitting the information that includes the instruction to cause grabbing of the virtual object; and
  transmitting an indication of the third rotation of the access device to the computing device, the indication including sending an instruction for rotation of a point of view of the GUI with respect to the virtual object.

7. An access device comprising:
  one or more sensors for sensing movement of the access device in six degrees of freedom including forward/backward, up/down, left/right, roll, pitch, and yaw;

a strain sensor;
a processor;
a memory, including instructions, that when executed by the processor, causes the processor to perform operations comprising:
detecting by the one or more sensors, a first rotation of the access device;
transmitting by the access device to a computing device, information about the first rotation of the access device, the information about the first rotation of the access device causing a corresponding first rotation of a point of view of a graphical user interface (GUI) about a cursor;
subsequent to the transmitting by the access device the information about the first rotation of the access device, detecting, by the strain sensor of the access device an amount of strain produced by squeezing of the access device;
determining that the amount of strain is above a first predetermined strain threshold;
detecting, by the one or more sensors, a second rotation of the access device subsequent to detecting by the strain sensor of the access device an amount of strain produced by squeezing of the access device;
transmitting, by the access device, to the computing device, information that includes an instruction to cause grabbing of a virtual object in the GUI in response to the detecting by the access device, that the amount of strain is above the first predetermined strain threshold, and rotating the virtual object in the user interface in response to the detecting, by the access device, the second rotation of the access device; and
subsequent to the transmitting, by the access device, to the computing device, the information that includes the instruction to cause grabbing:
detecting by the strain sensor a second amount of strain produced by squeezing of the access device that remains above the first predetermined threshold, and in response, transmitting to the computing device, information that includes an instruction to cause holding of the virtual object.

8. The access device according to claim 7, wherein the one or more sensors include a gyroscope, an accelerometer and a magnetic field sensor to sense movement of the access device in the six degrees of freedom.

9. The access device according to claim 8, further comprising a joystick mechanism mounted thereon.

10. The access device according to claim 7, further comprising a biometric sensor mounted on the access device for sensing a biometric feature of a user for use in verifying an authorization of the user.

11. The access device according to claim 7, further comprising at least one feedback component to provide feedback, based on receiving information from the computing device, and wherein the feedback comprises at least one of:
providing haptic feedback by the access device;
providing a sound by the access device; or
activating a light on the access device.

12. The access device according to claim 7, wherein the instructions comprise wirelessly providing information to the computing device for accessing data of a user at a remote location over a network.

13. The access device according to claim 7, wherein the instructions further comprise establishing a secure communication over a network with remotely-located information of a user accessed through the computing device using the access device, wherein the remotely-located information includes one or more cloud services presented by the computing device in a three-dimensional user interface.

14. The access device according to claim 7, wherein the access device is configured to communicate with multiple computing devices contemporaneously for interacting with multiple user interfaces displayed on multiple displays by the multiple computing devices.

15. The access device according to claim 7; wherein the access device further comprises a joystick mechanism, and wherein the cursor is controlled by the joystick mechanism.

16. A non-transitory machine-readable medium comprising instructions, that when executed by a machine, cause the machine to perform operations comprising:
detecting by an access device a first rotation of the access device;
transmitting by the access device to a computing device, information about the first rotation of the access device, the information about the first rotation of the access device causing a corresponding first rotation of a point of view of a graphical user interface (GUI) about a cursor;
subsequent to the transmitting by the access device the information about the first rotation of the access device, detecting, by a strain sensor of the access device an amount of strain produced by squeezing of the access device;
determining that the amount of strain is above a first predetermined strain threshold;
detecting, by the access device, second rotation of the access device subsequent to detecting by the strain sensor of the access device an amount of strain produced by squeezing of the access device, the access device being configured to detect movement in six degrees of freedom including forward/backward, up/down, left/right, roll, pitch, and yaw;
transmitting, by the access device, to the computing device, information that includes an instruction to cause grabbing of a virtual object in the GUI in response to the detecting by the access device; that the amount of strain is above the first predetermined strain threshold, and rotating the virtual object in the user interface in response to the detecting, by the access device, the second rotation of the access device; and
subsequent to the transmitting, by the access device, to the computing device, the information that includes the instruction to cause grabbing:
detecting by the strain sensor a second amount of strain produced by squeezing of the access device that remains above the first predetermined threshold, and in response, transmitting to the computing device, information that includes an instruction to cause holding of the virtual object.

17. The machine-readable medium according to claim 16, wherein the operations further comprise:
receiving a feedback message from the computing device, the feedback message indicating that a pointer of the user interface contacts the virtual object in the user interface; and
generating, by the access device, feedback based on the feedback message, the feedback comprising at least one of tactile feedback, a sound, or activation of a light.

18. The machine-readable medium according to claim 16, wherein the operations further comprise:

detecting additional movement of the access device subsequent to the transmitting the information that includes an instruction to cause grabbing of the virtual object;

detecting that the amount of strain continues to exceed the first predetermined strain threshold; and transmitting an indication of the additional movement to the computing device, wherein the transmitting includes sending an instruction to move the virtual object in the user interface corresponding to the additional movement.

19. The machine-readable medium according to claim 18, wherein the additional movement is detected as a flinging action followed by a level of strain below the first predetermined strain threshold; and wherein the operations further comprise, in response to detecting that the additional movement is the flinging action followed by the level of strain below the first predetermined strain threshold, an instruction is sent to remove the virtual object from the user interface.

* * * * *